(12) United States Patent
Zhang et al.

(10) Patent No.: US 12,269,832 B2
(45) Date of Patent: Apr. 8, 2025

(54) LITHIUM BORATE COMPOUND, ADDITIVE FOR LITHIUM SECONDARY BATTERY, NON-AQUEOUS ELECTROLYTE SOLUTION FOR LITHIUM SECONDARY BATTERY, LITHIUM SECONDARY BATTERY PRECURSOR, AND LITHIUM SECONDARY BATTERY AND METHOD OF PRODUCING THE SAME

(71) Applicant: MITSUI CHEMICALS, INC., Tokyo (JP)

(72) Inventors: Han Zhang, Funabashi (JP); Yusuke Shimizu, Ichihara (JP); Satoko Fujiyama, Kisarazu (JP); Kenichi Goto, Tokyo (JP); Shigeru Mio, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1114 days.

(21) Appl. No.: 17/262,297

(22) PCT Filed: Jul. 17, 2019

(86) PCT No.: PCT/JP2019/028087
§ 371 (c)(1),
(2) Date: Jan. 22, 2021

(87) PCT Pub. No.: WO2020/022142
PCT Pub. Date: Jan. 30, 2020

(65) Prior Publication Data
US 2021/0253602 A1      Aug. 19, 2021

(30) Foreign Application Priority Data

Jul. 26, 2018   (JP) .................... 2018-140561
Feb. 22, 2019   (JP) .................... 2019-030029

(Continued)

(51) Int. Cl.
C07F 1/02           (2006.01)
C07F 5/04           (2006.01)
(Continued)

(52) U.S. Cl.
CPC .................. C07F 1/02 (2013.01); C07F 5/04 (2013.01); H01M 4/505 (2013.01); H01M 4/525 (2013.01);
(Continued)

(58) Field of Classification Search
None
See application file for complete search history.

(56) References Cited

U.S. PATENT DOCUMENTS

2016/0240888 A1   8/2016   Hamasaki et al.
2021/0257664 A1   8/2021   Ning et al.

FOREIGN PATENT DOCUMENTS

CN      105556732 A    5/2016
DE      10118639 A1   10/2002
(Continued)

OTHER PUBLICATIONS

International Search Report (PCT/ISA/210) issued on Oct. 1, 2019, by the Japanese Patent Office as the International Searching Authority for International Application No. PCT/JP2019/028087 and an English translation of the International Search Report.
(Continued)

*Primary Examiner* — Carlos Barcena
(74) *Attorney, Agent, or Firm* — BUCHANAN INGERSOLL & ROONEY PC

(57) ABSTRACT

The present disclosure provides a lithium borate compound represented by the following Formula (I), an additive for a lithium secondary battery, which contains the lithium borate compound, a non-aqueous electrolyte solution for a lithium
(Continued)

secondary battery, a lithium secondary battery precursor, and a lithium secondary battery and method of producing the same. In Formula (I), R represents a single bond or an alkylene group having from 1 to 4 carbon atoms.

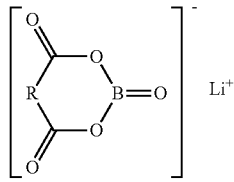

(I)

14 Claims, 8 Drawing Sheets

(30) Foreign Application Priority Data

Feb. 22, 2019 (JP) .................. 2019-030031
Feb. 22, 2019 (JP) .................. 2019-030033

(51) Int. Cl.
*H01M 4/505* (2010.01)
*H01M 4/525* (2010.01)
*H01M 10/0525* (2010.01)
*H01M 10/0567* (2010.01)
*H01M 4/02* (2006.01)

(52) U.S. Cl.
CPC ... *H01M 10/0525* (2013.01); *H01M 10/0567* (2013.01); *H01M 2004/028* (2013.01); *H01M 2300/0025* (2013.01)

(56) References Cited

FOREIGN PATENT DOCUMENTS

| JP | 3722685 B2 | 4/2002 |
| JP | 3730855 B2 | 1/2006 |
| WO | 2019/180945 A1 | 9/2019 |

OTHER PUBLICATIONS

Written Opinion (PCT/ISA/237) issued on Oct. 1, 2019, by the Japanese Patent Office as the International Searching Authority for International Application No. PCT/JP2019/028087.

Wu et al., "Novel Polyanionic Solid Electrolytes with Weak Coulomb Traps and Controllable Caps and Spacers", Chemistry of Materials, Jan. 1, 2002, vol. 14, No. 1, pp. 401-409. (Cited in Extended European Search Report issued on Apr. 7, 2022, in corresponding European Patent Application No. 19841146.4).

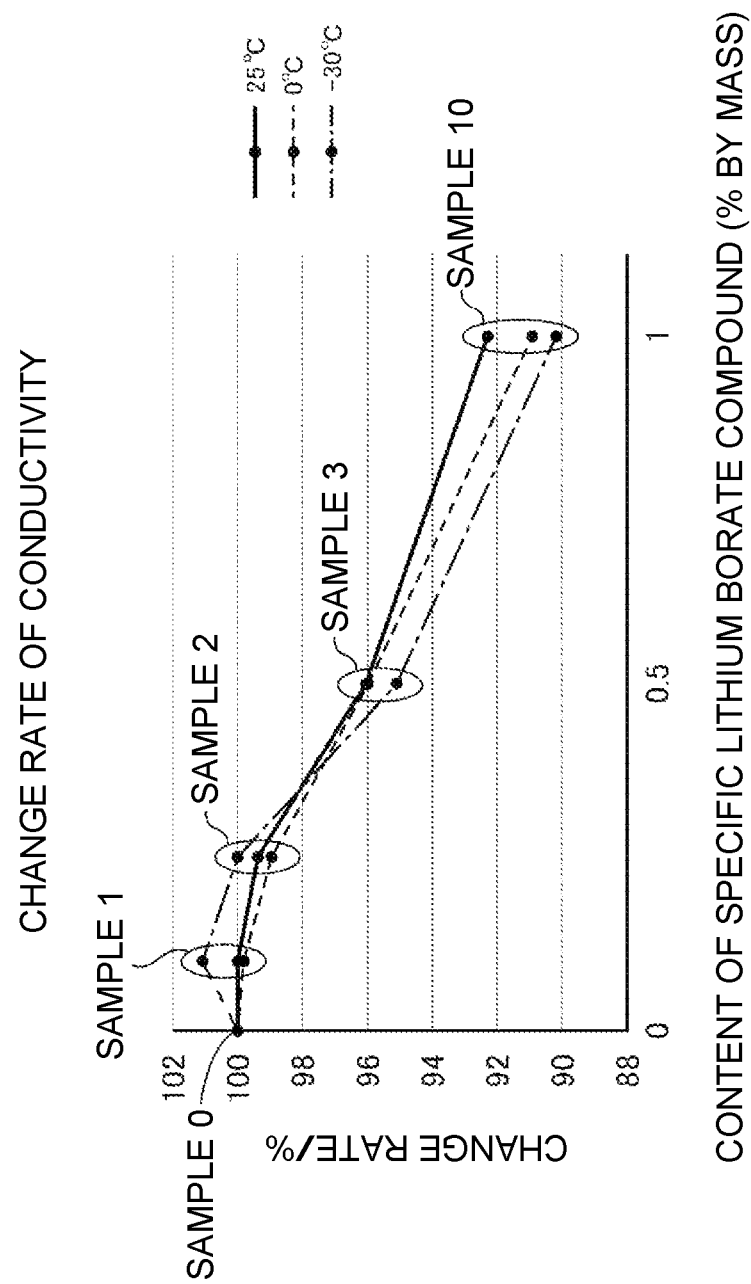

LITHIUM BORATE COMPOUND, ADDITIVE FOR LITHIUM SECONDARY BATTERY, NON-AQUEOUS ELECTROLYTE SOLUTION FOR LITHIUM SECONDARY BATTERY, LITHIUM SECONDARY BATTERY PRECURSOR, AND LITHIUM SECONDARY BATTERY AND METHOD OF PRODUCING THE SAME

TECHNICAL FIELD

The present disclosure relates to a lithium borate compound, an additive for a lithium secondary battery, a non-aqueous electrolyte solution for a lithium secondary battery, a lithium secondary battery precursor, and a lithium secondary battery and a method of producing the same.

BACKGROUND ART

Lithium borate compounds are utilized, for example, in the field of electrochemistry.

For example, Patent Document 1 discloses an electrolyte solution for a lithium ion battery containing lithium bis (oxalato) borate as an electrolyte having superior cycling and storage properties compared to conventional electrolytes.

Patent Document 2 discloses an electrolyte solution for a lithium ion battery containing lithium difluoro (oxalato) borate as an electrolyte having higher heat resistance and hydrolysis resistance compared to conventional electrolytes.

Patent Document 1: U.S. Pat. No. 3,730,855
Patent Document 2: U.S. Pat. No. 3,722,685

SUMMARY OF INVENTION

Technical Problem

A reduction in the internal resistance of a lithium secondary battery (a lithium-ion battery as referred to in Patent Documents 1 and 2) may be required.

An object of one aspect of the disclosure is to provide a novel lithium borate compound and an additive for a lithium secondary battery containing the above-described lithium borate compound.

An object of still another aspect of the disclosure is to provide a non-aqueous electrolyte solution for a lithium secondary battery that can reduce an internal resistance of a lithium secondary battery.

An object of still another aspect of the disclosure is to provide a lithium secondary battery with a reduced internal resistance.

An object of still another aspect of the disclosure is to provide a method of producing a lithium secondary battery and a lithium secondary battery precursor, which are suitable for producing the above-described lithium secondary battery.

Solution to Problem

Means for solving the above-described problems include the following aspects.

<1> A lithium borate compound represented by the following Formula (I).

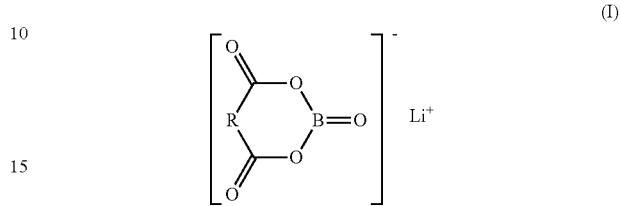

In Formula (I), R represents a single bond or an alkylene group having from 1 to 4 carbon atoms.

<2> The lithium borate compound according to <1>, wherein R is a single bond, a methylene group, or an ethylene group.

<3> The lithium borate compound according to <1> or <2>, which is a compound represented by the following Formula (II).

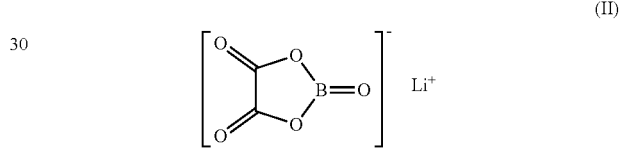

<4> An additive for a lithium secondary battery, the additive comprising the lithium borate compound according to any one of <1> to <3>.

<5> A non-aqueous electrolyte solution for a lithium secondary battery, the non-aqueous electrolyte solution comprising:
an electrolyte that is a lithium salt containing fluorine;
a non-aqueous solvent; and
the lithium borate compound according to any one of <1> to <3>.

<6> The non-aqueous electrolyte solution for a lithium secondary battery according to <5>, wherein a content of the lithium borate compound is from 0.10% by mass to 5.0% by mass with respect to a total amount of the non-aqueous electrolyte solution for a lithium secondary battery.

<7> The non-aqueous electrolyte solution for a lithium secondary battery according to <5> or <6>, further comprising vinylene carbonate.

<8> The non-aqueous electrolyte solution for a lithium secondary battery according to <7>, wherein a value obtained by dividing a content mass of the lithium borate compound by a content mass of the vinylene carbonate is 0.125 or more.

<9> The non-aqueous electrolyte solution for a lithium secondary battery according to any one of <7> or <8>, wherein a value obtained by dividing a content mass of the lithium borate compound by a content mass of the vinylene carbonate is 0.500 or less.

<10> A lithium secondary battery precursor comprising:
a casing; and
a positive electrode, a negative electrode, a separator, and an electrolyte solution housed in the casing, wherein:

the positive electrode is a positive electrode capable of storing and releasing lithium ions, the negative electrode is a negative electrode capable of storing and releasing lithium ions, and the electrolyte solution is the non-aqueous electrolyte solution for a lithium secondary battery according to any one of <5> to <9>.

<11> The lithium secondary battery precursor according to <10>, wherein the positive electrode comprises a lithium-containing composite oxide represented by the following Formula (C1) as a positive electrode active material:

  Formula (C1)

wherein, in Formula (C1), each of a, b, and c is each independently from more than 0 to less than 1, and a sum of a, b, and c is from 0.99 to 1.00.

<12> A method of producing a lithium secondary battery, the method comprising:

a process of preparing the lithium secondary battery precursor according to <10> or <11>; and a process of obtaining a lithium secondary battery by subjecting the lithium secondary battery precursor to an aging treatment, wherein the aging treatment includes subjecting the lithium secondary battery precursor to charging and discharging in an environment of from 30° C. to 50° C.

<13> A lithium secondary battery, comprising:

a casing, and a positive electrode, a negative electrode, a separator, and an electrolyte solution housed in the casing, wherein:

the positive electrode is a positive electrode capable of absorbing and releasing lithium ions, the negative electrode is a negative electrode capable of absorbing and releasing lithium ions, the electrolyte solution is a non-aqueous electrolyte solution containing an electrolyte that is a lithium salt containing fluorine and a non-aqueous solvent, a negative electrode film containing an organic component and an inorganic component, derived from a lithium borate compound represented by the following Formula (I) and the electrolyte, is formed on at least a portion of a surface of the negative electrode, and a positive electrode film containing an inorganic component, derived from a lithium borate compound represented by the following Formula (I) and the electrolyte, is formed on at least a portion of a surface of the positive electrode.

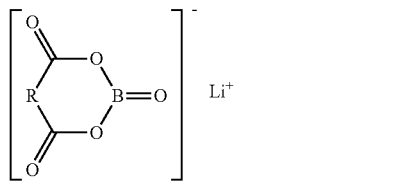

In Formula (I), R represents a single bond or an alkylene group having from 1 to 4 carbon atoms.

<14> The lithium secondary battery according to <13>, wherein the organic component in the negative electrode film contains a compound represented by the following Formula (III), and each of the inorganic component in the negative electrode film and the inorganic component in the positive electrode film contains a compound represented by the following Formula (IV).

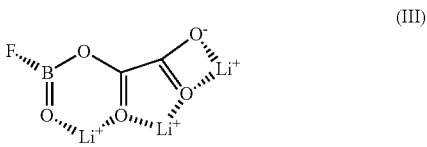

Advantageous Effects of Invention

According to one aspect of the disclosure, a novel lithium borate compound and an additive for a lithium secondary battery containing the above-described lithium borate compound are provided.

According to another aspect of the disclosure, a non-aqueous electrolyte solution for a lithium secondary battery capable of reducing an internal resistance of a lithium secondary battery is provided.

According to still another aspect of the present disclosure, a lithium secondary battery with a reduced internal resistance is provided.

According to still another aspect of the disclosure, a method of producing a lithium secondary battery and a lithium secondary battery precursor, which are suitable for producing the above-described a lithium secondary battery are provided.

BRIEF DESCRIPTION OF DRAWINGS

FIG. 8 is a graph illustrating the relationship between the content of the specific lithium borate compound in the non-aqueous electrolyte solution and the change rate (%) of the electrical conductivity.

DESCRIPTION OF EMBODIMENTS

Figure 1:
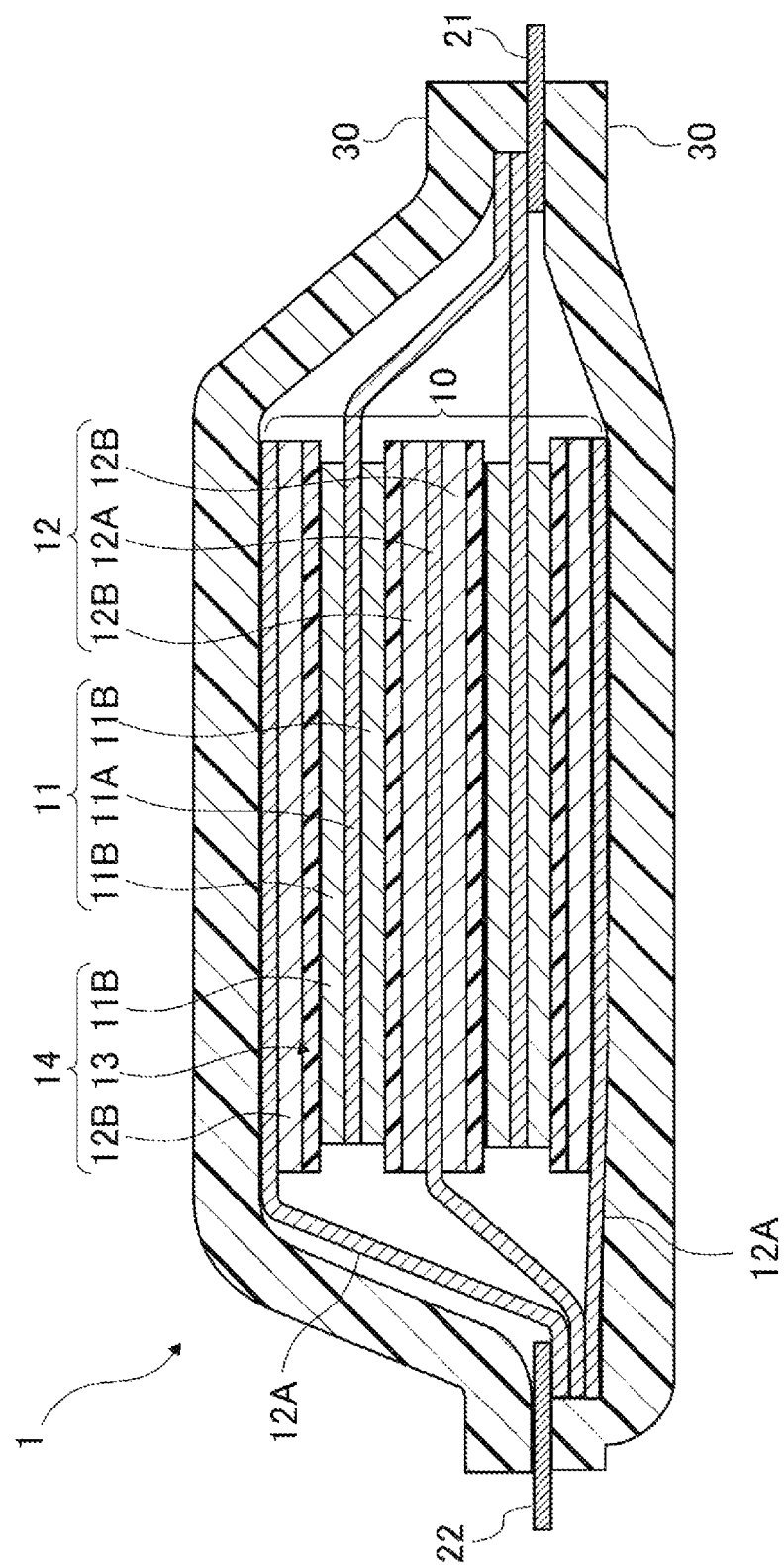
FIG. 1 is a schematic sectional view illustrating one example of the lithium secondary battery precursor according to one embodiment of the disclosure.

As used herein, any numerical range described using "to" refers to a range in which numerical values described before and after the "to" are included as the lower limit value and the upper limit value of the range.

As used herein, the amount of each component in a composition means, when there is a plurality of substances corresponding to each component in the composition, the total amount of the plurality of substances present in the composition, unless otherwise specified.

As used herein, the term "process" includes not only an independent step but also a step that is not clearly distinguishable from another step, provided that the intended purpose of the step is achieved. The same is true for the term "phase".

[Lithium Borate Compound]

The lithium borate compound of the disclosure is a lithium borate compound represented by the following Formula (I) (hereinafter, also referred to as "specific lithium borate compound"), which is a novel lithium borate compound that is different from conventional lithium borate compounds.

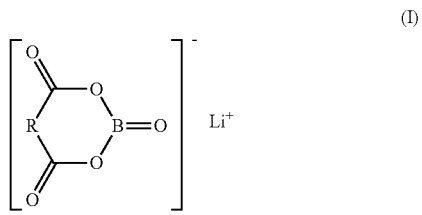

(I)

In Formula (I), R represents a single bond or an alkylene group having from 1 to 4 carbon atoms.

Examples of alkylene groups having from 1 to 4 carbon atoms represented by R in Formula (I) include unsubstituted alkylene groups having from 1 to 4 carbon atoms and alkylene groups having from 1 to 4 carbon atoms substituted with a fluorine atom.

The alkylene group having from 1 to 4 carbon atoms represented by R in Formula (I) may be a linear alkylene group or a branched alkylene group.

Specific examples of alkylene groups having from 1 to 4 carbon atoms represented by R in Formula (I) include linear or branched unsubstituted alkylene groups such as a methylene group, an ethylene group, a propylene group, a butylene group, or an isopropylene group; and
alkylene groups substituted with a fluorine atom such as a difluoromethylene group, a tetrafluoroethylene group, and a hexafluoropropylene group.

R in Formula (I) is preferably a single bond or an alkylene group having from 1 to 2 carbon atoms, more preferably a single bond or an alkylene group having 1 carbon atoms, and still more preferably a single bond.

Specific examples of the specific lithium borate compound (namely, a lithium borate compound represented by Formula (I)) include a compound represented by Formula (II) below (hereinafter, also referred to as "Compound (II)").

However, the specific lithium borate compound is not limited to these specific examples.

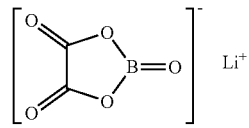

(II)

One Example of Method of Producing Specific Lithium Borate Compounds (Production Method X)

Hereinafter, an example of a method of producing the specific lithium borate compound (Production Method X) will be described. However, the method of producing specific lithium borate compounds of the disclosure is not limited to the Production Method X.

The Production Method X includes a reaction process in which a dicarboxylic acid compound, a lithium salt compound, and a boric acid compound are reacted in a solvent, and generated water is removed, to thereby obtain the specific lithium borate compound (namely, the lithium borate compound represented by Formula (I)).

Examples of dicarboxylic acid compounds in the reaction process include oxalic acid and dicarboxylic acids containing an alkylene group having from 1 to 4 carbon atoms. Oxalic acid, malonic acid, succinic acid, glutaric acid, adipic acid, and the like are preferable, and among them, oxalic acid or malonic acid is more preferable.

Examples of lithium salt compounds in the reaction process include lithium oxalate, lithium salts of dicarboxylic acids containing alkylene groups having from 1 to 4 carbon atoms. Lithium oxalate, lithium malonate, lithium succinate, lithium glutarate, lithium adipate, lithium hydroxide, and lithium carbonate are preferable, and among them, lithium oxalate, lithium hydroxide, or lithium carbonate is more preferable.

As a boric acid compound in the reaction process, boric acid, diboron trioxide, lithium metaborate, and lithium tetraborate are preferable, and among them, boric acid, diboron trioxide, or lithium tetraborate is more preferable.

Examples of solvents in the reaction process include non-aqueous solvents such as pentane, hexane, heptane, octane, nonane, decane, toluene, xylene (namely, orthoxylene, meta-xylene, or paraxylene), ethylbenzene, butylbenzene, pentylbenzene, hexylbenzene, heptylbenzene, propylbenzene, isopropylbenzene (also known as cumene), cyclohexylbenzene, tetralin, mesitylene, methylcyclopentane, cyclohexane, methylcyclohexane, cycloheptane, cyclooctane, or cyclononane.

The reaction in the reaction process can be carried out either under normal pressure or under reduced pressure.

The reaction in the reaction process is preferably carried out under an inert atmosphere (such as under a nitrogen atmosphere, or an argon atmosphere) from the viewpoint of preventing contamination of a component (such as water) that inhibits generation of the specific lithium borate compound.

The reaction temperature in the reaction process is preferably from 60° C. to 150° C., more preferably from 70° C. to 120° C., and still more preferably from 80° C. to 110° C.

When the reaction temperature is 60° C. or higher, generation of the specific lithium borate compound is easily promoted.

When the reaction temperature is 150° C. or less, decomposition of the generated specific lithium borate compound is suppressed, and the generation rate is easily improved.

The reaction time in the reaction process is preferably from 30 minutes to 12 hours, and from 1 hour to 8 hours from the viewpoint of efficiently progressing a reaction between a dicarboxylic acid compound, a lithium salt compound, and a boric acid compound.

A method of extracting the specific lithium borate compound after the reaction process is not particularly restricted.

For example, when the specific lithium borate compound is obtained by the reaction process as a solid of only a target component (namely, the specific lithium borate compound itself), the solid can be extracted without any special treatment.

When a slurry in which the specific lithium borate compound is dispersed in a solvent is obtained by the reaction process, the specific lithium borate compound can be extracted by separating the solvent from the slurry and drying.

When a solution in which the specific lithium borate compound is dissolved in a solvent was obtained by the reaction process, the specific lithium borate compound can be extracted by removing the solvent from the solution by heating and concentrating or the like.

When a solution in which the specific lithium borate compound is dissolved in a solvent was obtained by the reaction process, the specific lithium borate compound can also be extracted by adding a solvent in which the specific lithium borate compound is not dissolved to the solution to precipitate the specific lithium borate compound and then separating the solvent from the solution and drying.

Examples of a method of drying an extracted specific lithium borate compound include: a static drying method in a shelf-stage dryer; a fluid drying method in a conical dryer; a drying method using a device such as a hot plate or an oven; and a method of supplying warm air or hot air using a drying machine such as a dryer.

The pressure in drying an extracted specific lithium borate compound may be either normal pressure or reduced pressure.

The temperature in drying an extracted specific lithium borate compound is preferably from 20° C. to 150° C., more preferably from 50° C. to 140° C., and still more preferably from 80° C. to 130° C.

When the temperature is 20° C. or more, the drying efficiency is excellent. When the temperature is 150° C. or less, decomposition of a generated specific lithium borate compound is suppressed, and the specific lithium borate compound is easy to be stably extracted.

An extracted specific lithium borate compound may be used as it is, or may be used, for example, dispersed or dissolved in a solvent, or may be mixed with another solid substance.

Specific lithium borate compounds can be usefully used in applications such as an additive for a lithium battery (preferably an additive for a lithium secondary battery, and more preferably an additive for a non-aqueous electrolyte solution for a lithium secondary battery), a reaction reagent, a synthetic reaction catalyst, an electrolyte for various electrochemical devices, a doping agent, and a lubricant additive.

[Additive for Lithium Secondary Battery]

The additive for a lithium secondary battery of the disclosure includes the specific lithium borate compound described above. The additive for a lithium secondary battery of the disclosure is particularly suitable for an additive for a non-aqueous electrolyte solution for a lithium secondary battery.

[Non-aqueous Electrolyte Solution for Lithium Secondary Battery]

The non-aqueous electrolyte for a lithium secondary battery (hereinafter, also simply referred to as "non-aqueous electrolyte solution of the embodiment") according to one embodiment of the disclosure contains:

an electrolyte that is a lithium salt containing fluorine;
a non-aqueous solvent; and
the specific lithium borate compound described above.

According to the non-aqueous electrolyte solution of the embodiment, the internal resistance (in particular, the positive electrode resistance) of a lithium secondary battery can be reduced.

According to the non-aqueous electrolyte solution of the embodiment, the increase rate of a positive electrode resistance of a lithium secondary battery with respect to the storage period of the lithium secondary battery can be reduced, especially when the lithium secondary battery is stored for a certain period of time (such as two to three weeks) and thereafter, the lithium secondary battery is stored further.

The reasons for the above effect are assumed to be as follows. However, the non-aqueous electrolyte solution of the embodiment is not limited by the following reasons.

When producing a lithium secondary battery using the non-aqueous electrolyte solution of the embodiment, it is considered that in the production process (for example, the aging process described below), in the vicinity of the surface of the negative electrode of the lithium secondary battery, a reaction product of the specific lithium borate compound and LiF generated from an electrolyte is formed, and furthermore, an inorganic component (for example, Compound (VI) described below), which is a decomposition product of the reaction product, is formed. The inorganic component is considered to migrate to the vicinity of the surface of the positive electrode during the production process, and adhere to the surface of the positive electrode to form a positive electrode film. This is thought to increase the stability of the positive electrode (for example, suppress dissolution of metallic elements in the positive electrode active material), resulting in a reduction of the positive electrode resistance.

Furthermore, according to the non-aqueous electrolyte solution of the embodiment, an increase in the negative electrode resistance is also suppressed.

The reason for this is considered to be that a negative electrode film containing the above-described reaction products is formed on the surface of the negative electrode during the above described production process, and this negative electrode film increases the stability of the negative electrode.

It is believed from the reasons described above that the non-aqueous electrolyte solution of the embodiment can reduce the internal resistance (especially the positive electrode resistance) of a lithium secondary battery.

The above-described adhesion of an inorganic component to the surface of a positive electrode (namely, formation of a positive electrode film) is thought to progress even during a storage period when a lithium secondary battery is stored after production of the lithium battery.

This is considered to reduce the increase rate of the positive electrode resistance of a lithium secondary battery with respect to the storage period of the lithium secondary battery when the lithium secondary battery is stored for a certain period of time (for example, two to three weeks) and then stored further.

<Specific Lithium Borate Compound>

The non-aqueous electrolyte solution of the embodiment contains at least one specific lithium borate compound.

A preferred form of the specific lithium borate compound is as described above.

The content of the specific lithium borate compound in the non-aqueous electrolyte solution of the embodiment is not particularly limited, and is preferably from 0.10% by mass to 5.0% by mass with respect to the total amount of the non-aqueous electrolyte solution.

When the content of the specific lithium borate compound with respect to the total amount of the non-aqueous electrolyte solution is 0.10% by mass or more, the effect of the non-aqueous electrolyte solution of the embodiment is more effectively achieved. The content of the specific lithium borate compound with respect to the total amount of the non-aqueous electrolyte solution is more preferably 0.20% by mass or more, still more preferably 0.25% by mass or more, and still more preferably 0.50% by mass or more.

When the content of the specific lithium borate compound with respect to the total amount of the non-aqueous electrolyte solution is 5.0% by mass or less, the chemical stability of the non-aqueous electrolyte solution is more improved.

The content of the specific lithium borate compound with respect to the total amount of the non-aqueous electrolyte solution is more preferably 3.0% by mass or less, still more preferably 2.0% by mass or less, and still more preferably 1.0% by mass or less.

<Electrolyte>

The non-aqueous electrolyte solution of the embodiment contains at least one electrolyte that is a lithium salt containing fluorine (hereinafter, also referred to as a "fluorine-containing lithium salt").

Examples of the fluorine-containing lithium salt include:
an inorganic acid anion salt such as lithium hexafluorophosphate ($LiPF_6$), lithium tetrafluoroborate ($LiBF_4$), lithium arsenate ($LiAsF_6$), or lithium tantalum hexafluoride ($LiTaF_6$); and
an organic acid anion salt such as lithium trifluoromethanesulfonate ($LiCF_3SO_3$), lithium bis(trifluoromethanesulfonyl)imide ($Li(CF_3SO_2)_2N$), or lithium bis(pentafluoroethanesulfonyl)imide ($Li(C_2FsSO_2)_2N$).

As the fluorine-containing lithium salt, $LiPF_6$ is particularly preferred.

The non-aqueous electrolyte of the embodiment may contain an electrolyte that is a fluorine-free lithium salt.

Examples of the fluorine-free lithium salt include lithium perchlorate ($LiClO_4$), lithium aluminum tetrachloride ($LiAlCl_4$), and lithium decachlorodecaborate ($Li_2B_{10}Cl_{10}$).

The ratio of the fluorine-containing lithium salt to the total electrolyte contained in the non-aqueous electrolyte solution of the embodiment is preferably from 50% by mass to 100% by mass, more preferably from 60% by mass to 100% by mass, and still more preferably from 80% by mass to 100% by mass.

The ratio of $LiPF_6$ to the total electrolyte contained in the non-aqueous electrolyte solution of the embodiment is preferably from 50% by mass to 100% by mass, more preferably from 60% by mass to 100% by mass, and still more preferably from 80% by mass to 100% by mass.

The concentration of an electrolyte in the non-aqueous electrolyte solution of the embodiment is preferably from 0.1 mol/L to 3 mol/L, and more preferably from 0.5 mol/L to 2 mol/L.

The concentration of $LiPF_6$ in the non-aqueous electrolyte solution of the embodiment is preferably from 0.1 mol/L to 3 mol/L, and more preferably from 0.5 mol/L to 2 mol/L.

<Non-Aqueous Solvent>

The non-aqueous electrolyte solution of the embodiment contains at least one non-aqueous solvent.

Examples of the non-aqueous solvent include a cyclic carbonate, a fluorine-containing cyclic carbonate, a chain carbonate, a fluorine-containing chain carbonate, an aliphatic carboxylic acid ester, a fluorine-containing aliphatic carboxylic acid ester, a γ-lactone, a fluorine-containing γ-lactone, a cyclic ether, a fluorine-containing cyclic ether, a chain ether, a fluorine-containing chain ether, a nitrile, an amide, a lactam, a nitromethane, a nitroethane, a nitroethane, a sulfolane, a trimethyl phosphate, a dimethyl sulfoxide, a dimethyl sulfoxide phosphoric acid.

Examples of the cyclic carbonate include ethylene carbonate (EC), propylene carbonate (PC), and butylene carbonate (BC).

Examples of the fluorine-containing cyclic carbonate include fluoroethylene carbonate (FEC).

Examples of the chain carbonate include dimethyl carbonate (DMC), diethyl carbonate (DEC), ethyl methyl carbonate (EMC), methyl propyl carbonate (MPC), ethyl propyl carbonate (EPC), and dipropyl carbonate (DPC).

Examples of the aliphatic carboxylic acid ester include methyl formate, methyl acetate, methyl propionate, methyl butyrate, methyl isobutyrate, methyl trimethyl butyrate, ethyl formate, ethyl acetate, ethyl propionate, ethyl butyrate, ethyl isobutyrate, and ethyl trimethybutyrate.

Examples of the γ-lactone include γ-butyrolactone and γ-valerolactone.

Examples of the cyclic ether include tetrahydrofuran, 2-methyltetrahydrofuran, tetrahydropyran, 1,3-dioxolan, 4-methyl-1,3-dioxolan, 1,3-dioxane, and 1,4-dioxane.

Examples of the chain ether include 1,2-ethoxyethane (DEE), ethoxymethoxyethane (EME), diethyl ether, 1,2-dimethoxyethane, and 1,2-dibuthoxyethane.

Examples of the nitrile include acetonitrile, glutaronitrile, adiponitrile, methoxyacetonitrile, and 3-methoxypropionitrile.

Examples of the amide include N,N-dimethylformamide.

Examples of the lactam include N-methylpyrrolidinone, N-methyloxazolidinone, and N,N'-dimethylimidazolidinone.

The non-aqueous solvent preferably contains at least one selected from the group consisting of a cyclic cararbonate, a fluorine-containing cyclic carbonate, a fluorine-containing cyclic carbonate, a chain carbonate, and a fluorine-containing chain carbonate.

In this case, the ratio of the total of the cyclic carbonate, the fluorine-containing cyclic carbonate, the fluorine-containing cyclic carbonate, the chain carbonate, and the fluorine-containing chain carbonate in a non-aqueous solvent is preferably from 50% by mass to 100% by mass, more preferably from 60% by mass to 100% by mass, and still more preferably from 80% by mass to 100% by mass.

The non-aqueous solvent preferably contains at least one selected from the group consisting of a cyclic carbonate and a chain of carbonate.

In this case, the ratio of the total of a cyclic carbonate and a chain carbonate in the non-aqueous solvent is preferably from 50% by mass to 100% by mass, more preferably from 60% by mass to 100% by mass, and still more preferably from 80% by mass to 100% by mass.

The ratio of the non-aqueous solvent in the non-aqueous electrolyte solution of the embodiment is preferably 60% by mass or more, and more preferably 70% by mass or more.

The upper limit of the ratio of the non-aqueous solvent in the non-aqueous electrolyte solution of the embodiment depends on the content of another component (the specific lithium borate compound, an electrolyte, or the like), and is, for example, 99% by mass, preferably 97% by mass, and still more preferably 90% by mass.

The intrinsic viscosity of the non-aqueous solvent is, from the viewpoint of improving the dissociation of an electrolyte and the mobility of ions, preferably 10.0 mPa·s or less at 25° C.

<Cyclic Carbonate Ester Having Unsaturated Bond>

The non-aqueous electrolyte solution of the embodiment may contain at least one type of cyclic carbonate ester having an unsaturated bond, from the viewpoint of further improving the chemical stability of the non-aqueous electrolyte solution.

In general, when the non-aqueous electrolyte solution contains a cyclic carbonate ester having an unsaturated bond, the internal resistance of a battery tends to increase.

However, since the non-aqueous electrolyte solution of the embodiment contains the specific lithium borate compound, the non-aqueous electrolyte solution of the embodiment can further reduce the internal resistance of a battery even when the non-aqueous electrolyte solution contains a cyclic carbonate ester having an unsaturated bond.

Rather, when the non-aqueous electrolyte solution of the embodiment contains a cyclic carbonate ester having an unsaturated bond, the non-aqueous electrolyte solution of the embodiment has an advantage of having a wide range of improvement in reducing the internal resistance by adding the specific lithium borate compound.

Examples of the cyclic carbonate ester having an unsaturated bond include a vinylene carbonate-based compound, a vinyl ethylene carbonate-based compound, or a methylene ethylene carbonate-based compound.

Examples of the vinylene carbonate-based compound include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

Examples of the vinyl ethylene carbonate-based compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one.

Examples of the methylene ethylene carbonate-based compound include 4-methylene-1,3-dioxolan-2-one, 4,4-dimethyl-5-methylene-1,3-dioxolan-2-one, 4,4-diethyl-5-methylene-1,3-dioxolan-2-one.

As the cyclic carbonate ester having an unsaturated bond, vinylene carbonate is particularly preferable.

When the non-aqueous electrolyte solution of the embodiment contains a cyclic carbonate ester containing an unsaturated bond, the content of the cyclic carbonate ester containing an unsaturated bond with respect to the total amount of the non-aqueous electrolyte solution is preferably from 0.10% by mass to 5.0% by mass, more preferably from 0.50% by mass to 5.0% by mass, still more preferably from 1.0% by mass to 5.0% by mass, and still more preferably from 1.0% by mass to 3.0% by mass.

When the non-aqueous electrolyte solution of the embodiment contains vinylene carbonate, the content of vinylene carbonate with respect to the total amount of the non-aqueous electrolyte solution is preferably from 0.10% by mass to 5.0% by mass, more preferably from 0.50% by mass to 5.0% by mass, still more preferably from 1.0% by mass to 5.0% by mass, and still more preferably from 1.0% by mass to 3.0% by mass.

When the non-aqueous electrolyte solution of the embodiment contains vinylene carbonate, the value obtained by dividing the content mass of the specific lithium borate compound by the content mass of vinylene carbonate (hereinafter, also referred to as "content mass ratio [specific lithium borate compound/vinylene carbonate]") is preferably 0.050 or more, more preferably 0.100 or more, and still more preferably 0.125 or more.

When the content mass ratio [specific lithium borate compound/vinylene carbonate] is 0.050 or more, the increase in the internal resistance of a lithium secondary battery after storage can be better controlled.

The upper limit of the content mass ratio [specific lithium borate compound/vinylene carbonate] is not particularly limited, and from the viewpoint of more effectively obtaining the effect caused by vinylene carbonate, the content mass ratio [specific lithium borate compound/vinylene carbonate] is preferably 1.00 or less, and more preferably 0.500 or less.

<Another Component>

The non-aqueous electrolyte solution of the embodiment may contain at least one other component other than the above-described components.

Examples of the other components include a sultone (namely, a cyclic sulfonic acid ester), and an acid anhydride.

Examples of the sultone include a propane sultone and a propene sultone. These may be used singly or in a mixture of a plurality of kinds thereof.

As the sultone, a propene sultone is preferable.

When the non-aqueous electrolyte solution of the embodiment contains a sultone, the content of the sultone with respect to the total amount of the non-aqueous electrolyte solution is preferably from 0.1% by mass to 3% by mass, and more preferably from 0.5% by mass to 3% by mass.

Examples of the acid anhydride include:
a carboxylic acid anhydride such as succinic anhydride, glutaric anhydride, or maleic anhydride;
a disulfonic acid anhydride such as ethanedisulfonic anhydride or propanedisulfonic anhydride; and
an anhydride of a carboxylic acid and a sulfonic acid, such as sulfobenzoic anhydride, sulfopropionic anhydride, or sulfobutyric anhydride.

These may be used singly or in a mixture of a plurality of kinds thereof.

As the acid anhydride, sulfobenzoic anhydride is preferable.

When the non-aqueous electrolyte solution of the embodiment contains an acid anhydride, the content of the acid anhydride in the total amount of the non-aqueous electrolyte solution is preferably from 0.1% by mass to 3% by mass, and more preferably from 0.5% by mass to 3% by mass.

The intrinsic viscosity of the non-aqueous electrolyte solution of the embodiment is, from the viewpoint of improving the dissociation of an electrolyte and the mobility of ions, preferably 10.0 mPa's or less at 25° C.

<Method of Producing Non-aqueous Electrolyte Solution>

The method of producing the non-aqueous electrolyte solution of the embodiment is not particularly limited. The non-aqueous electrolyte solution of the embodiment may be produced by mixing components.

Examples of methods for producing the non-aqueous electrolyte solution of the embodiment include
a production method including:
a process of dissolving an electrolyte in a non-aqueous solvent to obtain a solution; and
a process of adding the specific lithium borate compound (and another additive as necessary) to the obtained solution and mixing the solution to obtain a non-aqueous electrolyte solution.

In the production method according to this example, it is preferable that the electrical conductivity of the obtained non-aqueous electrolyte solution is reduced with respect to the electrical conductivity of the solution (before addition of the specific lithium borate compound). With a non-aqueous electrolyte solution obtained by a production method of this aspect, the effect of the above-described non-aqueous electrolyte solution (namely, the effect of reducing the internal resistance of a battery) is more effectively achieved.

[Lithium Secondary Battery Precursor]

The lithium secondary battery precursor according to one embodiment of the disclosure (hereinafter, also simply referred to as "battery precursor of the embodiment") includes:
a casing; and
a positive electrode, a negative electrode, a separator, and an electrolyte solution housed in the casing, wherein
the positive electrode is a positive electrode capable of storing and releasing lithium ions,
the negative electrode is a negative electrode capable of storing and releasing lithium ions, and
the electrolyte solution is the non-aqueous electrolyte solution of the embodiment described above.

Herein, the term "lithium secondary battery precursor" means a lithium secondary battery prior to being charged and discharged.

The lithium secondary battery of the embodiment, as described below, is produced by housing a positive electrode, a negative electrode, a separator, and a non-aqueous electrolyte solution in a casing to produce a lithium secondary battery precursor, and then subjecting the obtained lithium secondary battery precursor to charging and discharging (preferably an aging process including charging and discharging).

The battery precursor of the embodiment includes the non-aqueous electrolyte solution of the embodiment.

Therefore, according to the battery precursor of the embodiment, the same effects as those of the non-aqueous electrolyte solution of the embodiment are achieved.

<Casing>

The casing of the battery precursor of the embodiment is not particularly limited, and examples thereof include a known casing for a lithium secondary battery.

Examples of the casing include a casing containing a laminated film, and a casing composed of a battery can and a battery can lid.

<Positive Electrode>

The positive electrode of the battery precursor of the embodiment is a positive electrode capable of absorbing and releasing lithium ions.

The positive electrode of the battery precursor of the embodiment preferably contains at least one positive electrode active material capable of absorbing and releasing lithium ions.

The positive electrode of the battery precursor of the embodiment more preferably includes: a positive electrode current collector; and a positive electrode composite material layer containing a positive electrode active material and a binder.

The positive electrode composite material layer is provided on at least a portion of the surface of the positive electrode current collector.

(Positive Electrode Active Material)

The positive electrode active material is not particularly limited as long as the material is capable of storing and releasing lithium ions, and can be a positive electrode active material normally used for a lithium secondary battery.

Examples of the positive electrode active material include:
an oxide composed of lithium (Li) and nickel (Ni) as constituent metallic elements; and
an oxide composed of Li, Ni, and at least one metallic element other than Li and Ni (for example, a transition metallic element, and a typical metallic element) as a constituent metallic element.

The metallic elements other than Li and Ni are preferably contained in the oxide in the same or lesser ratio than Ni, in terms of the number of atoms.

The metallic elements other than Li and Ni can be at least one metallic element selected from the group consisting of, for example, Co, Mn, Al, Cr, Fe, V, Mg, Ca, Na, Ti, Zr, Nb, Mo, W, Cu, Zn, Ga, In, Sn, La, and Ce. These positive electrode active materials may be used singly or in a mixture of a plurality of kinds thereof.

A positive electrode active material preferably contains a lithium-containing composite oxide represented by the following Formula (C1) (hereinafter, also referred to as "NCM").

The lithium-containing composite oxide (C1) has an advantage of a high energy density per unit volume and an excellent thermal stability.

$$LiNi_aCo_bMn_cO_2 \qquad \text{Formula (C1)}$$

In Formula (C1), a, b, and c are each independently more than 0 and less than 1, and the sum of a, b, and c is from 0.99 to 1.00.

Specific examples of the NCM include $LiNi_{0.33}Co_{0.33}Mn_{0.33}O_2$, $LiNi_{0.5}Co_{0.3}Mn_{0.2}O_2$, $LiNi_{0.6}Co_{0.2}Mn_{0.2}O_2$, and $LiNi_{0.8}Co_{0.1}Mn_{0.1}O_2$.

The positive electrode active material may contain a lithium-containing composite oxide represented by the following Formula (C2) (hereinafter, also referred to as "NCA").

$$Li_tNi_{1-x-y}Co_xAl_yO_2 \qquad \text{Formula (C2)}$$

In Formula (C2), t is from 0.95 to 1.15, x is from 0 to 0.3, y is from 0.1 to 0.2, and the sum of x and y is less than 0.5.

Specific examples of the NCA include $LiNi_{0.8}Co_{0.15}Al_{0.05}O_2$.

When the positive electrode of the battery precursor of the embodiment includes a positive electrode current collector and a positive electrode composite material layer containing a positive electrode active material and a binder, the content of the positive electrode active material in the positive electrode composite material layer with respect to the total amount of the positive electrode composite material layer is, for example, 10% by mass or more, preferably 30% by mass or more, still more preferably 50% by mass or more, and particularly preferably 70% by mass or more.

The content of the positive electrode active material in the positive electrode composite material layer is, for example, 99.9% by mass or less, and preferably 99% by mass or less.

(Binder)

Examples of the binder that can be contained in the positive electrode composite material layer include polyvinyl acetate, polymethyl methacrylate, nitrocellulose, a fluororesin, and rubber particles.

Examples of the fluororesin include polytetrafluoroethylene (PTFE), polyvinylidene fluoride (PVDF), tetrafluoroethylene-hexafluoropropylene copolymer (FEP), and vinylidene fluoride-hexafluoropropylene copolymer.

Examples of rubber particles include styrene-butadiene rubber particles, and acrylonitrile rubber particles.

Among these, a fluororesin is preferable from the viewpoint of improving the oxidation resistance of the positive electrode composite material layer.

Binders can be used singly or in combination of two or more kinds thereof if necessary.

The content of the binder in the positive electrode composite material layer is preferably from 0.1% by mass to 4% by mass with respect to the positive electrode composite material layer, from the viewpoint of balancing the physical properties of the positive electrode composite material layer (for example, electrolyte solution permeability, and peeling strength) and battery performance.

When the content of the binder is 0.1% by mass or more, the adhesion of the positive electrode composite material layer to the positive electrode current collector and the adhesion of positive electrode active materials to each other are further improved.

When the content of the binder is 4% by mass or more, the amount of the positive electrode active material in the positive electrode composite material layer can be increased, and thus the battery capacity is further improved.

(Conductive Aid)

When the positive electrode in the battery precursor of the embodiment includes a positive electrode current collector and a positive electrode composite material layer, the positive electrode composite material layer preferably includes a conductive aid.

As the conductive aid, a known conductive aid can be used.

As the conductive aid, a known conductive aid can be used.

The known conductive aid is not particularly limited as long as the conductive aid is a carbon material having conductivity, and graphite, carbon black, conductive carbon fibers (carbon nanotubes, carbon nanofibers, or carbon fibers), fullerenes, or the like can be used singly or in combination of two or more kinds thereof.

Examples of commercially available carbon blacks include Toka Black #4300, #4400, #4500, #5500, and the like (manufactured by Tokai Carbon Co., Ltd., Furnace Black), Printex L, and the like (manufactured by Degussa, Furnace Black), Raven7000, 5750, 5250, 5000ULTRAIII, 5000ULTRA, and the like, Conductex SC ULTRA, Conductex 975ULTRA, and the like, PUER BLACK100, 115, 205, and the like (manufactured by Columbian, Furnace Black), #2350, #2400B, #2600B, #30050B, #3030B, #3230B, #3350B, #3400B, #5400B, and the like (manufactured by Mitsubishi Chemical Corporation, Furnace Black), MONARCH 1400, 1300, 900, VulcanXC-72R, BlackPearls2000, LITX-50, LITX-200, and the like (manufactured by Cabot, Furnace Black), Ensaco 250G, Ensaco 260G, Ensaco 350G, Super-P (manufactured by TIMCAL), Ketjen Black EC-300J, EC-600JD (manufactured by Akzo), and Denka Black, Denka Black HS-100, and FX-35 (manufactured by Denka Company Limited., Acetylene Black).

Examples of graphite include, but are not limited to, artificial graphite and natural graphite (for example, flake graphite, lump graphite, or earthy graphite).

(Another Component)

When the positive electrode of the battery precursor of the embodiment includes a positive electrode current collector and a positive electrode composite material layer, the positive electrode composite material layer may include another component in addition to the above-described components.

Examples of the other component include a thickening agent, a surfactant, a dispersing agent, a wetting agent, and a defoaming agent.

(Positive Electrode Current Collector)

As the positive electrode current collector, a variety of materials can be used, and for example, a metal or an alloy is used.

More specific examples of the positive electrode current collector include aluminum, nickel, and SUS. Among them, aluminum is preferable from the viewpoint of a balance between high conductivity and cost. Here, "aluminum" means pure aluminum or an aluminum alloy.

As a positive electrode current collector, an aluminum foil is particularly preferably used.

Examples of the aluminum foil include, but are not limited to, A1085 material, and A3003 material.

(Method of Forming Positive Electrode Composite Material Layer)

A positive electrode composite material layer can be formed, for example, by coating a positive electrode composite material slurry containing a positive electrode active material and a binder to the surface of a positive electrode current collector and drying the slurry.

As a solvent contained in the positive electrode composite material slurry, an organic solvent such as N-methyl-2-pyrrolidone (NMP) is preferable.

In coating a positive electrode composite mixture slurry to a positive electrode current collector and drying the slurry, the coating method and drying method are not particularly limited.

Examples of the coating method include slot-die coating, slide coating, curtain coating, and gravure coating.

Examples of the drying method include: drying with warm air, hot air, or low-humidity air; vacuum drying; and drying with infrared (for example, far infrared) radiation.

The drying time and drying temperature are not particularly limited, and the drying time is, for example, from 1 to 30 minutes, and the drying temperature is, for example, from 40° C. to 80° C.

The method of producing a positive electrode composite material layer preferably includes a process of coating a positive electrode composite mixture slurry on a positive electrode current collector, drying the slurry, and then reducing the porosity of a positive electrode active material layer by pressure treatment using a mold press, a roll press, or the like.

<Negative Electrode>

The negative electrode of the battery precursor of the embodiment is a negative electrode capable of absorbing and releasing lithium ions.

The negative electrode of the battery precursor of the embodiment preferably contains at least one negative electrode active material capable of absorbing and releasing lithium ions.

The negative electrode of the battery precursor of the embodiment more preferably includes: a negative electrode current collector; and a negative electrode composite material layer containing a negative electrode active material and a binder.

The negative electrode composite material layer is provided on at least a portion of the surface of the negative electrode current collector.

(Negative Electrode Active Material)

The negative electrode active material is not limited as long as the material is capable of absorbing and releasing lithium ions, and, for example, at least one selected from the group consisting of lithium metal, a lithium-containing alloy, a metal or an alloy capable of alloying with lithium, an oxide capable of doping or de-doping lithium ions, a transition metal nitride capable of doping or de-doping lithium ions, and a carbon material capable of doping or de-doping lithium ions (may be used singly, or in a mixture containing two or more kinds thereof) can be used.

Among these, a carbon material capable of doping or de-doping lithium ions is preferable.

Examples of the above-described carbon materials include carbon black, activated carbon, a graphite material (for example, artificial graphite, or natural graphite), and an amorphous carbon material.

The above-described carbon material may be in the form of a fiber, a sphere, a potato, or a flake.

The particle size of the above-described carbon material is not particularly limited, and the size is, for example, from 5 μm to 50 μm, and preferably from 20 μm to 30 μm.

Specific examples of amorphous carbon materials include hard carbon, coke, mesocarbon microbeads (MCMB) calcined to 1,500° C. or less, and mesophase pitch carbon fiber (MCF).

Examples of the graphite material include natural graphite and artificial graphite.

As artificial graphite, graphitized MCMB and graphitized MCF are used.

For graphite materials, those containing boron or the like can also be used.

For graphite materials, those coated with a metal such as gold, platinum, silver, copper, or tin, those coated with amorphous carbon, and those obtained by mixing amorphous carbon and graphite can also be used.

These carbon materials may be used singly or in a mixture of two or more kinds thereof.

(Conductive Aid)

When the negative electrode in the battery precursor of the present embodiment comprises a negative electrode current collector and a negative electrode composite layer, the negative electrode composite material layer preferably includes a conductive aid.

As the conductive aid, a known conductive aid can be used.

Specific examples of the conductive aid that may be contained in the negative electrode composite material layer are the same as the above-described specific examples of the conductive aid that may be contained in the positive electrode composite material layer.

(Another Component)

When the negative electrode of the battery precursor of the embodiment includes a negative electrode current collector and a negative electrode composite material layer, the negative electrode composite material layer may contain another component in addition to the above-described components.

Examples of the other component include a thickening agent, a surfactant, a dispersing agent, a wetting agent, and a defoaming agent.

(Method of Forming Negative Electrode Composite Material Layer)

The negative electrode composite material layer can be formed, for example, by coating a negative electrode composite material slurry containing a negative electrode active material and a binder to the surface of the negative electrode current collector and drying the slurry.

Water is preferably used as a solvent contained in the negative electrode composite material slurry, and if necessary, a liquid medium that is compatible with water may be used, for example, to improve the coatability on a current collector.

Examples of liquid media compatible with water include an alcohol, a glycol, a cellosolve, an amino alcohol, an amine, a ketone, a carboxylic acid amide, a phosphoric acid amide, a sulfoxide, a carboxylic acid ester, a phosphoric acid ester, an ether, and a nitrile, and such a liquid medium may be used as long as the liquid medium is compatible with water.

Preferable methods of forming a negative electrode composite material layer are the same as the above-described preferable methods of forming a positive electrode composite material layer.

<Separator>

Examples of the separator of the battery precursor of the embodiment include a porous flat plate containing a resin such as polyethylene (PE), polypropylene (PP), polyester, cellulose, or polyamide.

Examples of the separator also include a non-woven fabric containing the above-described resin.

Suitable examples thereof include a single layer or multilayered porous resin sheet mainly composed of one or more polyolefin resins.

The thickness of the separator can be from 15 μm to 30 μm, for example.

The separator is preferably disposed between a positive electrode and a negative electrode.

<Electrolyte Solution>

The electrolyte solution in the battery precursor of the embodiment is the above-described non-aqueous electrolyte solution of the embodiment.

Preferable aspects of the non-aqueous electrolyte solution of the embodiment are as described above.

<Method of Producing Battery Precursor>

The method of producing a battery precursor of the embodiment is not particularly limited.

One example of the method of producing a battery precursor of the embodiment includes a process of housing a positive electrode, a negative electrode, a separator, and an electrolyte solution in a casing.

Preferably, the above-described example includes:
a process of housing a positive electrode, a negative electrode, and a separator in a casing; and
a process of injecting an electrolyte solution into the casing in which the positive electrode, the negative electrode, and the separator are housed.

<One Example of Lithium Secondary Battery Precursor>

An example of the lithium secondary battery precursor of the embodiment will be described with reference to FIG. 1, but the lithium secondary battery precursor of the embodiment is not limited to the following example.

FIG. 1 is a schematic sectional view illustrating a lithium secondary battery precursor 1, which is an example of the lithium secondary battery precursor of the embodiment.

The lithium secondary battery precursor 1 is one example of a layered-type lithium secondary battery.

In addition to such layered-type lithium secondary battery precursor, examples of the lithium secondary battery of the embodiment include a wound-type lithium secondary battery having a structure in which a positive electrode, a separator, a negative electrode, and a separator are stacked in the order mentioned and wound in layers.

As illustrated in FIG. 1, the lithium secondary battery precursor 1 has a structure in which a battery element 10 to which a positive electrode lead 21 and a negative electrode lead 22 are attached is enclosed inside an exterior casing 30 formed of a laminated film.

In the lithium secondary battery precursor 1, the positive electrode lead 21 and the negative electrode lead 22 are led out in opposite directions to each other from the inside of the exterior casing 30 to the outside.

The positive electrode lead 21 and the negative electrode lead 22 can be attached to the positive electrode current collector and the negative electrode current collector as described below by, for example, ultrasonic welding or resistance welding.

Although not illustrated, the positive electrode lead and the negative electrode lead may be led in the same direction from the inside of the exterior casing to the outside.

As illustrated in FIG. 1, the battery element 10 has a structure in which a positive electrode 11, in which positive electrode composite material layers 11B are formed on both main surfaces of a positive electrode current collector 11A, a separator 13, and a negative electrode 12, in which negative electrode composite material layers 12B are formed on both main surfaces of a negative electrode current collector 12A, are layered.

In this structure, the positive electrode composite material layer 11B formed on one main surface of the positive electrode current collector 11A of the positive electrode 11 and the negative electrode composite material layer 12B formed on one main surface of the negative electrode current collector 12A of the negative electrode 12 adjacent to the positive electrode 11 face each other via the separator 13.

The non-aqueous electrolyte solution (not illustrated) of the embodiment is injected into the exterior casing 30 of the lithium secondary battery precursor 1. The non-aqueous electrolyte solution of the embodiment is impregnated in the positive electrode composite material layer 11B, the separator 13, and the negative electrode composite material layer 12B.

In the lithium secondary battery precursor 1, one single battery layer 14 is formed by the adjacent positive electrode composite material layer 11B, separator 13, and negative electrode composite material layer 12B.

The positive and negative electrodes may have each active material layer formed on one side of each current collector.

One example of the lithium secondary battery according to an embodiment of the disclosure described below is a lithium secondary battery in which a film is formed on the surface of each of the positive electrode composite material layer 11B and the negative electrode composite material layer 12B of the lithium secondary battery precursor 1 by charging and discharging the lithium secondary battery precursor 1.

[Method of Producing Lithium Secondary Battery]

The method of producing a lithium secondary battery according to an embodiment of the disclosure (hereinafter, also referred to as "method of producing the battery of the embodiment") is a method of producing a lithium secondary battery, the method including:

a process (hereinafter, also referred to as "preparation process") of preparing the battery precursor of the embodiment; and a process (hereinafter, also referred to as "aging process") of obtaining a lithium secondary battery by subjecting the battery precursor to an aging treatment, wherein the aging treatment includes subjecting the battery precursor to charging and discharging in an environment of from 30° C. to 50° C.

In the method of producing a battery of the embodiment, the battery precursor of the embodiment is subjected to an aging treatment including charging and discharging to obtain a lithium secondary battery, and thus the same effect as that of the non-aqueous electrolyte solution of the embodiment is achieved.

The preparation process in the method of producing a battery of the embodiment may be a process of simply preparing the lithium secondary battery precursor, which has already been produced, in order to be provided to an aging process, or may be a process of producing the lithium secondary battery precursor.

The aging treatment in the aging process preferably includes:

an initial holding phase in which the battery precursor is held in an environment of from 30° C. to 50° C.;

an initial charging phase in which the battery precursor after the initial holding phase is charged in an environment of from 30° C. to 50° C.;

a second holding phase in which the battery precursor after the initial charging phase is held in an environment of 30° C. to 50° C.; and a charging and discharging phase in which the battery precursor after the second holding phase is subjected to a combination of charging and discharging one or more times at a temperature of from 30° C. to 50° C.

According to the above-described preferable aspect, the effect of reducing the internal resistance of a lithium secondary battery (in particular, reducing the positive electrode resistance) is more effectively achieved.

An example of a reaction mechanism in the above-described preferable aspect will be described below, but the reaction mechanism in the disclosure is not limited to the following example.

The following example is an example of a case in which the above-described Compound (II) is used as the specific lithium borate compound contained in the electrolyte solution in the battery precursor.

Specific lithium borate compounds (for example, Compound (II)) are considered to be easily coordinated to lithium ions (+Li) in a non-aqueous electrolyte solution, as described below. This may be due to the fact that the anions in the specific lithium borate compound have a distribution of electron density (in other words, there is a bias in the electron density). A Compound (II) coordinated to a lithium ion will be referred to as "(II)+$^+$Li" in the following.

By coordinating the specific lithium borate compound to a lithium ion, the movement of the lithium ion is restricted, which reduces the electrical conductivity of a non-aqueous electrolyte solution (see Examples below).

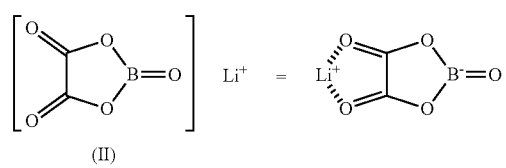

(II)

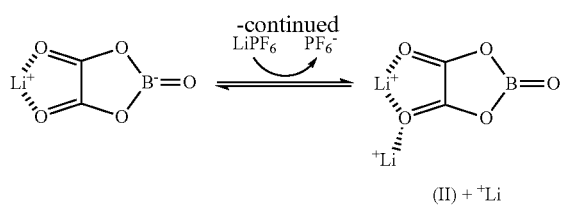

(II) + ⁺Li

In the initial charging phase, the following reactions are expected to proceed on the negative electrode side through electrochemical reactions.

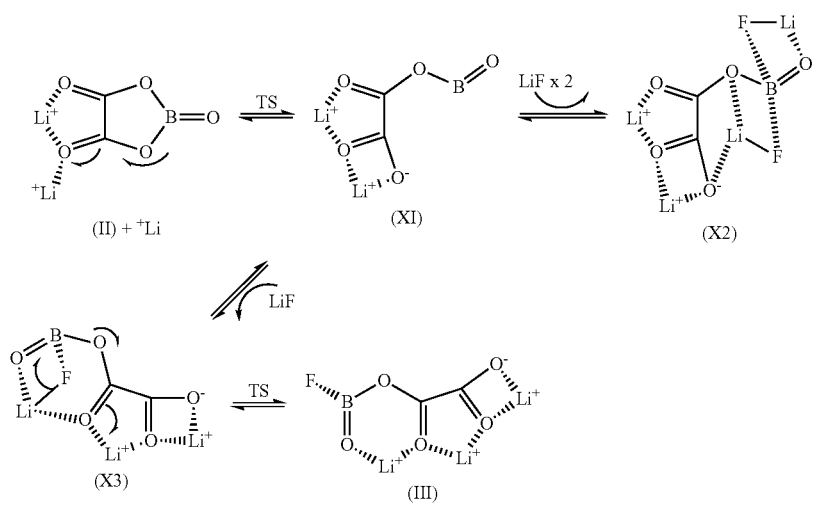

In other words, it is considered that the compound "(II)+⁺Li" obtains a transition energy, and an intermediate product X1 and an intermediate product X2 are generated by state transition (TS).

Furthermore, it is considered that the intermediate product X1 reacts with lithium fluoride (LiF) derived from a fluorine-containing lithium salt (for example, LiPF$_6$) to generate an intermediate product X3, and an organic component (for example, Compound (III)) is generated from the generated intermediate product X3 by state transition (TS).

Furthermore, as illustrated below, it is considered that the intermediate product X2 decomposes to form an inorganic component (for example, Compound (VI)).

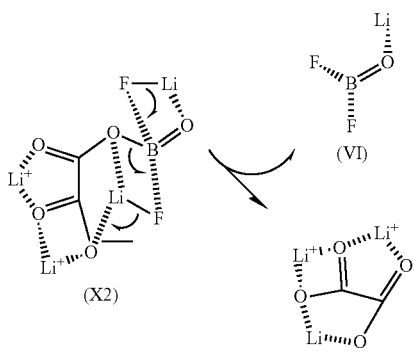

As described above, in the initial charging phase, it is considered that a negative electrode film (namely, a solid electrolyte interface (SEI) film) containing an organic component (for example, Compound (III)) and an inorganic component (for example, Compound (VI)) is formed on the surface of the negative electrode by electrochemical reactions. This negative electrode film suppresses decomposition of a compound (for example, a non-aqueous solvent) in a non-aqueous electrolyte solution in the vicinity of the negative electrode, and suppresses co-insertion of the compound and delamination of the negative electrode composite material layer caused by the co-insertion of the compound.

The above-described negative electrode film is considered to be stably maintained also during the subsequent charging and discharging phase.

Accordingly, the negative electrode resistance of the lithium secondary battery is considered to be reduced.

During formation of a negative electrode film in the initial charging phase, it is considered that Compound (II) forms an inorganic component in the negative electrode film and/or an intermediate product X1 and an intermediate product X2 (hereinafter, collectively simply referred to as "intermediate products"), which are the raw materials of the inorganic component, in excess of the organic component. In other words, when the ratio obtained by dividing the amount of organic components by the total amount of inorganic components and intermediate products in the initial charging phase (namely, the ratio [amount of organic components/total amount of inorganic components and intermediate products]) is designated as the ratio a0 and the ratio for a stable negative electrode film [amount of organic components/total amount of inorganic components and intermediate products] is designated as the ratio a1, the ratio a0 is considered to be smaller than the ratio a1. In other words, it is considered that Compound (II) dares to form an excessive amount of inorganic components during formation of a negative electrode film.

An inorganic component is considered to adhere to the surface of a positive electrode due to the influence of boron in addition to the surface of a negative electrode.

Next, in the second holding phase and/or the charging and discharging phase, the following reactions are considered to proceed due to chemical reactions.

During the second holding phase and/or the charging and discharging phase, the excess inorganic component (for example, Compound (VI)) and intermediate products present in the vicinity of the surface of the negative electrode, in terms of the ratio a1, are considered to gradually disperse into a non-aqueous electrolyte solution.

By discharging in this state, the intermediate products dispersed in the non-aqueous electrolyte solution decompose to form an inorganic component (for example, Compound (VI)). The generated inorganic component (for example, Compound (VI)) and the above-described excess inorganic component (for example, Compound (VI)) originally present are considered to migrate to the surface of the positive electrode along with migration of lithium ions. Here, few organic components are considered to reach the surface of the positive electrode due to the strong interaction with a resin separator.

It is considered that when a lithium ion migrated to the surface of the positive electrode is reduced as a lithium oxide by receiving an electron on the surface of the positive electrode, an inorganic component (for example, Compound (VI)) migrated to the surface of the positive electrode adheres to the surface of the positive electrode due to the effect of boron and forms a positive electrode film.

It is considered that the inorganic component adheres to the surface of the positive electrode to form a positive electrode film, which enhances the stability of the positive electrode and suppresses an increase in the resistance of the positive electrode.

This effect is more effectively achieved when the positive electrode includes a positive electrode composite material layer and the positive electrode composite material layer contains a lithium-containing composite oxide such as NMC or NCA as a positive electrode active material.

More specifically, in this case, desorption and insertion of lithium ions is carried out on the crystal structure of the lithium-containing composite oxide. During the incorporation of lithium ions into the crystal structure, metal atoms constituting the crystal structure may elute from the surface of the positive electrode into a non-aqueous electrolyte solution. When the crystal structure is broken by the elution of the metal atoms, the positive electrode resistance may increase due to insufficient incorporation of lithium ions.

In the reaction mechanism according to the above-described example, the inorganic component, which has migrated with the lithium ion, is adhered to the surface of the positive electrode and, in particular, boron in the inorganic component is adhered to oxygen in the crystal structure, thereby suppressing elution of the metal atoms and stabilizing the crystal structure.

This suppresses an increase in the positive electrode resistance when the positive electrode includes a positive electrode composite material layer and the positive electrode composite material layer contains a lithium-containing composite oxide such as NMC or NCA as a positive electrode active material.

According to the above-described preferable method of producing a battery of the embodiment, a negative electrode resistance and a positive electrode resistance are reduced as described above. As a result, the internal resistance of the battery is reduced.

Adhesion of the inorganic component to the surface of the positive electrode (namely, formation of a positive electrode film) is considered to continue even in a case in which a lithium secondary battery is stored after completion of production (aging process) of the lithium secondary battery.

As a result, it is considered that the rate of increase in the positive electrode resistance of a lithium secondary battery with respect to the storage period of the lithium secondary battery can be reduced when the lithium secondary battery is stored for a certain period of time (for example, two to three weeks) and then stored further.

The following is a description of a preferable aspect of each of the above-described phases.
(Initial Holding Phase)

The initial holding phase is a phase in which the battery precursor is held in an environment of from 30° C. to 50° C. (preferably from 35° C. to 45° C.).

The holding time in the initial holding phase is preferably from 1 hour to 48 hours, more preferably from 3 hours to 24 hours, and still more preferably from 6 hours to 18 hours.
(Initial Charging Phase)

The initial charging phase is a phase in which the battery precursor after the initial holding phase is charged in an environment of from 30° C. to 50° C. (preferably from 35° C. to 45° C.).

In the initial charging phase, the battery precursor is preferably charged in multiple stages (preferably from 2 to 4 stages). In this case, it is preferable to increase the charging rate (namely, charging current) at each step.

In the initial charging phase, it is preferable to charge the battery precursor in stages up to a State Of Charge (SOC) of from 80% to 95%.
(Second Holding Phase)

The second holding phase is a phase in which the battery precursor after the initial charging phase is held in an environment of from 30° C. to 50° C. (preferably from 35° C. to 45° C.).

The holding time in the second holding phase is preferably from 1 hour to 60 hours, more preferably from 6 hours to 36 hours, and still more preferably from 12 hours to 36 hours.
(Charging and Discharging Phase)

The charging and discharging phase is a phase in which a combination of charging and discharging is applied to the battery precursor after the second holding phase one or more times (preferably two or more times, more preferably from two to five times, and still more preferably from two to four times) in an environment of from 30° C. to 50° C. (preferably from 35° C. to 45° C.).

Charging in the charging and discharging phase is preferably carried out up to a State Of Charge (SOC) of from 90% to 100% (more preferably from 95% to 100%).

Discharging in the charging and discharging phase is preferably carried out up to a SOC of from 60% to 90%.
(Third Holding Phase)

The above-described preferable aspect of the aging process may further include a third holding phase in which the battery after the charging and discharging phase is held in an environment of from 30° C. to 50° C. (preferably from 35° C. to 45° C.).

This allows adhesion of an inorganic component to the surface of a positive electrode to progress further, resulting in a greater reduction in positive electrode resistance.

The holding time in the third holding phase is preferably from 1 to 30 days, more preferably from 2 to 15 days, and still more preferably from 3 to 10 days.
[Lithium Secondary Battery]

The lithium secondary battery according to one embodiment of the disclosure (hereinafter, referred to as "battery of the embodiment") is
  a lithium secondary battery, including
  a casing, and
  a positive electrode, a negative electrode, a separator, and an electrolyte solution housed in the casing, wherein
    the positive electrode is a positive electrode capable of absorbing and releasing lithium ions, the negative electrode is a negative electrode capable of absorbing and releasing lithium ions, the electrolyte solution is a non-aqueous electrolyte solution containing an electrolyte that is a lithium salt containing fluorine and a non-aqueous solvent, a negative electrode film containing an organic component (for example, the above-described Compound (III)) and an inorganic component (for example, the above-described Compound (VI)) derived from the specific lithium borate compound and the electrolyte is formed on at least a portion of the surface of the negative electrode, and a positive electrode film containing an inorganic component (for example, the above-described Compound (VI)) derived from the specific lithium borate compound and the electrolyte is formed on at least a portion of the surface of the positive electrode.

The battery of the embodiment can be suitably produced by the above-described method of producing a battery of the embodiment.

Since the battery of the embodiment includes the above-described negative electrode film and the above-described positive electrode film, the battery of the embodiment has the same effect as a battery produced by the method of producing a battery of the embodiment.

A preferable aspect of a casing, a positive electrode, a negative electrode, and a separator in the battery of the embodiment is the same as a preferable aspect of a casing, a positive electrode, a negative electrode, and a separator in the battery precursor of the embodiment, as described above.

A preferable aspect of a non-aqueous electrolyte solution in the battery of the embodiment is the same as a preferable aspect of the non-aqueous electrolyte solution of the embodiment, except that the non-aqueous electrolyte solution in the battery of the embodiment is not limited to containing the specific lithium borate compound.

The non-aqueous electrolyte solution in the battery of the embodiment may contain the specific lithium borate compound.

For example, when the battery of the embodiment is produced by the method of producing a battery of the embodiment, the specific lithium borate compound may be completely consumed by an aging treatment, or a portion of the specific lithium borate compound may remain.

Other Embodiment

The non-aqueous electrolyte solution for a lithium secondary battery of the disclosure, the lithium secondary battery precursor of the disclosure, the method of producing a lithium secondary battery of the disclosure, and the lithium battery of the disclosure are not limited to the above-described embodiments, respectively.

Examples of other embodiments of the non-aqueous electrolyte solution for a lithium secondary battery of the disclosure, the lithium secondary battery precursor of the disclosure, the method of producing a lithium secondary battery of the disclosure, and the lithium battery of the disclosure include a form in which the specific lithium borate compound in the above-described embodiment is changed to a compound represented by the following Formula (A).

The scope of a compound represented by Formula (A) below includes the scope of the specific lithium borate compound, and is broader than the scope of the specific lithium borate compound.

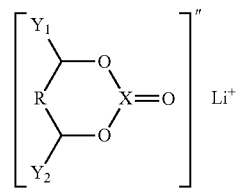
(A)

In Formula (A), X represents a hetero atom, $Y_1$ and $Y_2$ independently represent phosphorus, sulfur, oxygen, silicon, an alkyl group, or a carboxy group, and R represents a single bond or an alkylene group having from 1 to 4 carbon atoms.

In a form in which the specific lithium borate compound in the above-described embodiment is changed to a compound represented by the following Formula (A), the same effect as in the above-described embodiment is also achieved.

This is because the anion in the compound represented by Formula (A) has the same electron density bias as the anion in the specific lithium borate compound.

Examples of the heteroatom represented by X in Formula (A) include boron, silicon, phosphorus, and sulfur.

R in Formula (A) is synonymous with R in Formula (I), and a preferable aspect thereof is also the same.

A compound represented by Formula (A) when both $Y_1$ and $Y_2$ are oxygen is a compound represented by the following Formula (B).

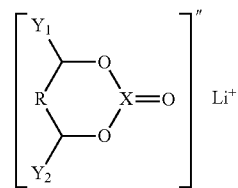
(B)

R and X in Formula (B) are synonymous with R and X in Formula (A), respectively.

A compound represented by Formula (B) when X is boron is a lithium borate compound (namely, specific lithium borate compound) represented by Formula (I) described above.

The additive for a lithium secondary battery of the disclosure, the non-aqueous electrolyte solution for a lithium secondary battery of the disclosure, the lithium secondary battery precursor of the disclosure, the method of producing a lithium secondary battery of the disclosure, and the lithium secondary battery of the disclosure described above are applicable to an application, for example, an electronic device such as a mobile phone, or s laptop computer; an electric vehicle; a hybrid vehicle; or a power source for power storage.

The additive for a lithium secondary battery of the disclosure, the non-aqueous electrolyte solution for a lithium secondary battery of the disclosure, the lithium secondary battery precursor of the disclosure, the method of producing a lithium secondary battery of the disclosure, and the lithium secondary battery of the disclosure are particularly suitable for use in hybrid or electric vehicles.

EXAMPLES

The following are Examples of the disclosure, but the disclosure is not limited to the following Examples.

In the following, unless otherwise specified, "room temperature" refers to 25° C., and "%" refers to % by mass. "wt. %" in the following is synonymous with "% by mass".

[Synthesis Example 1 of Compound (II)]

A 100 mL flask with a stirrer, a thermometer, a gas induction line, an exhaust line, and a Deanstag tube was prepared. The Deanstag tube was filled with toluene for removal of distilled water.

After purging the above-described 100 mL flask with dry nitrogen gas, 1.80 g (0.02 mol) of oxalic acid, 2.04 g (0.02 mol) of lithium oxalate, 2.47 g (0.04 mol) of boric acid, and 80 g of toluene were placed therein, stirred, and mixed to obtain a homogeneous slurry. While stirring, 10 g of water was added to this slurry, and after 30 minutes, heating was started and the toluene was refluxed at a temperature of from 85 to 110° C. Heating, stirring, and toluene reflux were continued, and distilled water was continued to be separated from the toluene and removed in the Deanstag tube. The heating was stopped when the refluxing toluene was free of water, and the reaction liquid was cooled down to room temperature (25° C.). The reaction liquid obtained by the above process was a slurry with a solid precipitate. This slurry was filtered and the solid (wet cake) was separated, and then the solid was placed in 40 g of acetonitrile and stirred at room temperature (25° C.) for 1 hour for a slurry washing treatment. The slurry was filtered again and the solid (wet cake) was separated, and the resulting wet cake was dried in an Inert Oven at 120° C. for 8 hours to obtain 2.44 g of solid product.

The obtained product was dissolved in heavy dimethyl sulfoxide solvent, and $^{13}$C-NMR analysis and $^{11}$B-NMR analysis were carried out. The chemical shifts [ppm] of the spectra obtained by $^{13}$C-NMR and $^{11}$B-NMR analysis were as follows.

$^{13}$C-NMR: 161.3 ppm
$^{11}$B-NMR: 4.0 ppm

From $^{13}$C-NMR, a spectral pattern derived from an oxalic acid skeleton was confirmed, and from $^{11}$B-NMR, the obtained product was confirmed to be a kind of lithium borate compound different from lithium bis(oxalato) borate (chemical shift: 6.4 ppm).

The obtained product was subjected to mass spectrometry by ESI-MS. The results were as follows.

ESI-MS (neg.) measured value: m/z 114.98 [M-Li]$^-$

Mass spectrometry analysis confirmed that the mass of the anion species (the above-described "[M-Li]$^-$") in the product (the above-described "M") corresponded to the mass of the anion species in Compound (II).

The obtained product was subjected to differential scanning calorimetry (DSC) measurements from room temperature to 600° C.

As a result, no melting point was observed in the obtained product, and a thermal decomposition behavior starting endothermic reaction at around 150° C. and showing an endothermic peak at 187° C. was observed.

The DSC measurements were carried out using a differential scanning calorimeter (DSC 220C type) manufactured by Seiko Instruments Inc.

As described above, the product obtained by Synthesis Example 1 was confirmed to be a kind of lithium borate compound, specifically, Compound (II), from $^{13}$C-NMR analysis, $^{11}$B-NMR analysis, and ESI-MS measurements.

Therefore, the results of Synthesis Example 1 indicated that Compound (II) was obtained by the following reaction scheme.

$$\underset{O}{\overset{O}{\parallel}}\!\!\begin{matrix}OH\\OH\end{matrix} + \underset{O}{\overset{O}{\parallel}}\!\!\begin{matrix}OH\\OH\end{matrix} + 2\ \underset{HO}{\overset{OH}{\underset{|}{B}}}\!\!OH \longrightarrow$$

$$2\left[\begin{matrix}O\\O\end{matrix}\!\!\underset{O}{\overset{O}{\diagdown}}\!\!B=O\right]Li^+ + 4\ H_2O$$

Synthesis Example 2 of Compound (II)

A treatment was carried out in the same manner as in Synthesis Example 1, except that the raw material for preparation was changed from 1.80 g (0.02 mol) of oxalic acid, 2.04 g (0.02 mol) of lithium oxalate, and 2.47 g (0.04 mol) of boric acid to 3.60 g (0.04 mol) of oxalic acid, 1.68 g (0.04 mol) of lithium hydroxide monohydrate, and 2.47 g (0.04 mol) of boric acid. A treatment was performed by changing the solvent for slurry washing from 40 g of acetonitrile to 40 g of acetone. Eventually, 2.27 g of solid product was obtained.

The obtained product was dissolved in heavy dimethyl sulfoxide solvent, and $^{13}$C-NMR analysis and $^{11}$B-NMR analysis were carried out. The chemical shifts [ppm] of the spectra obtained by $^{13}$C-NMR and $^{11}$B-NMR analysis were as follows.

$^{13}$C-NMR: 161.3 ppm
$^{11}$B-NMR: 4.0 ppm

From $^{13}$C-NMR, a spectral pattern derived from an oxalic acid skeleton was confirmed, and from $^{11}$B-NMR, the obtained product was confirmed to be a kind of lithium borate compound different from lithium bis(oxalato) borate (chemical shift: 6.4 ppm).

The obtained product was subjected to mass spectrometry by ESI-MS. The results were as follows.

ESI-MS (neg.) measured value: m/z 114.98 [M-Li]$^-$

Mass spectrometry analysis confirmed that the mass of the anion species in the product corresponded to the mass of the anion species in Compound (II).

Furthermore, the obtained product was subjected to differential scanning calorimetry (DSC) measurements from room temperature to 600° C.

As a result, no melting point was observed in the obtained product, and a thermal decomposition behavior starting endothermic reaction at around 150° C. and showing an endothermic peak at 187° C. was observed.

As described above, the product obtained by synthesis of Synthesis Example 2 was confirmed to be a kind of lithium borate compound, specifically, Compound (II), from $^{13}$C-NMR analysis, $^{11}$B-NMR analysis, and ESI-MS measurements. Therefore, the results of Synthesis Example 2 indicated that Compound (II) was obtained by the following reaction scheme.

$$\underset{O}{\overset{O}{\parallel}}\!\!\begin{matrix}OH\\OH\end{matrix} + LiOH \cdot H_2O + \underset{HO}{\overset{OH}{\underset{|}{B}}}\!\!OH \longrightarrow$$

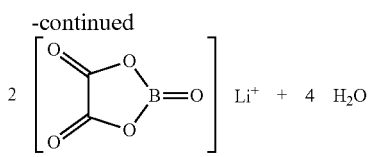

Synthesis Example 3 of Compound (II)

A treatment was carried out in the same manner as in Synthesis Example 1, except that the raw material for preparation was changed from 1.80 g (0.02 mol) of oxalic acid, 2.04 g (0.02 mol) of lithium oxalate, and 2.47 g (0.04 mol) of boric acid to 3.60 g (0.04 mol) of oxalic acid, 1.48 g (0.02 mol) of lithium carbonate, and 2.47 g (0.04 mol) of boric acid. A treatment was performed by changing the solvent for slurry washing from 40 g of acetonitrile to 40 g of acetone. Eventually, 2.64 g of solid product was obtained.

The obtained product was dissolved in heavy dimethyl sulfoxide solvent, and $^{13}$C-NMR analysis and $^{11}$B-NMR analysis were carried out. The chemical shifts [ppm] of the spectra obtained by $^{13}$C-NMR and $^{11}$B-NMR analysis were as follows.

$^{13}$C-NMR: 161.3 ppm $^{11}$B-NMR: 4.0 ppm

From $^{13}$C-NMR, a spectral pattern derived from an oxalic acid skeleton was confirmed, and from $^{11}$B-NMR, the obtained product was confirmed to be a kind of lithium borate compound different from lithium bis(oxalato) borate (chemical shift: 6.4 ppm).

The obtained product was subjected to mass spectrometry by ESI-MS. The results were as follows.

ESI-MS (neg.) measured value: m/z 114.98 [M-Li]$^-$

Mass spectrometry analysis confirmed that the mass of the anion species in the product corresponded to the mass of the anion species in Compound (II).

Furthermore, the obtained product was subjected to differential scanning calorimetry (DSC) measurements from room temperature to 600° C.

As a result, no melting point was observed in the obtained product, and a thermal decomposition behavior starting endothermic reaction at around 150° C. and showing an endothermic peak at 187° C. was observed.

As described above, the product obtained by synthesis of Synthesis Example 3 was confirmed to be a kind of lithium borate compound, or Compound (II), from $^{13}$C-NMR analysis, $^{11}$B-NMR analysis, and ESI-MS measurements. Therefore, the results of Synthesis Example 3 indicated that Compound (II) was obtained by the following reaction scheme.

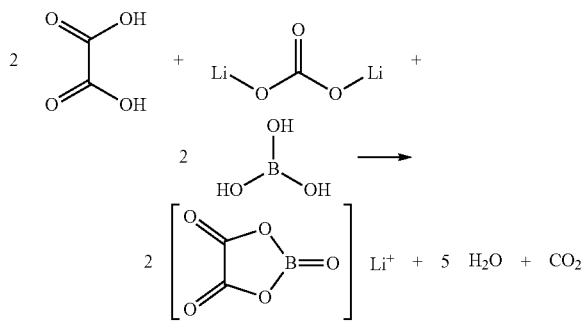

Synthesis Example 4 of Compound (II)

A treatment was carried out in the same manner as in Synthesis Example 1, except that the raw material for preparation was changed from 1.80 g (0.02 mol) of oxalic acid, 2.04 g (0.02 mol) of lithium oxalate, and 2.47 g (0.04 mol) of boric acid to 3.60 g (0.04 mol) of oxalic acid, 0.74 g (0.01 mol) of lithium carbonate, and 1.69 g (0.01 mol) of lithium tetraborate. A treatment was performed by changing the solvent for slurry washing from 40 g of acetonitrile to 40 g of acetone. Eventually, 2.75 g of solid product was obtained.

The obtained product was dissolved in heavy dimethyl sulfoxide solvent, and $^{13}$C-NMR analysis and $^{11}$B-NMR analysis were carried out. The chemical shifts [ppm] of the spectra obtained by $^{13}$C-NMR and $^{11}$B-NMR analysis were as follows.

$^{13}$C-NMR: 161.3 ppm $^{11}$B-NMR: 4.0 ppm

From $^{13}$C-NMR, a spectral pattern derived from an oxalic acid skeleton was confirmed, and from $^{11}$B-NMR, the obtained product was confirmed to be a kind of lithium borate compound different from lithium bis(oxalato) borate (chemical shift: 6.4 ppm).

The obtained product was subjected to mass spectrometry by ESI-MS. The results were as follows.

ESI-MS (neg.) measured value: m/z 114.98 [M-Li]$^-$

Mass spectrometry analysis confirmed that the mass of the anion species in the product corresponded to the mass of the anion species in Compound (II).

Furthermore, the obtained product was subjected to differential scanning calorimetry (DSC) measurements from room temperature to 600° C.

As a result, no melting point was observed in the obtained product, and a thermal decomposition behavior starting endothermic reaction at around 150° C. and showing an endothermic peak at 187° C. was observed.

As described above, the product obtained by Synthesis Example 4 was confirmed to be a kind of lithium borate compound, or Compound (II), from $^{13}$C-NMR analysis, $^{11}$B-NMR analysis, and ESI-MS measurements. Therefore, the results of Synthesis Example 4 indicated that Compound (II) was obtained by the following reaction scheme.

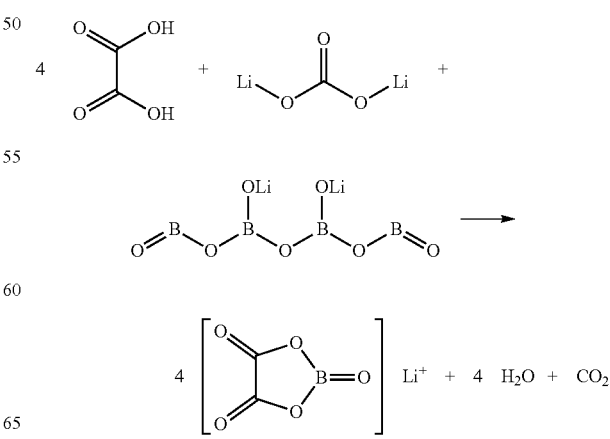

Synthesis Example 5 of Compound (II)

A treatment was carried out in the same manner as in Synthesis Example 1, except that the raw material for preparation was changed from 1.80 g (0.02 mol) of oxalic acid, 2.04 g (0.02 mol) of lithium oxalate, and 2.47 g (0.04 mol) of boric acid to 2.70 g (0.03 mol) of oxalic acid, 1.02 g (0.01 mol) of lithium oxalate, and 1.69 g (0.01 mol) of lithium tetraborate. A treatment was performed by changing the solvent for slurry washing from 40 g of acetonitrile to 40 g of ethyl acetate. Eventually, 2.72 g of solid product was obtained.

The obtained product was dissolved in heavy dimethyl sulfoxide solvent, and $^{13}$C-NMR analysis and $^{11}$B-NMR analysis were carried out. The chemical shifts [ppm] of the spectra obtained by $^{13}$C-NMR and $^{11}$B-NMR analysis were as follows.

$^{13}$C-NMR: 161.3 ppm
$^{11}$B-NMR: 4.0 ppm

From $^{13}$C-NMR, a spectral pattern derived from an oxalic acid skeleton was confirmed, and from $^{11}$B-NMR, the obtained product was confirmed to be a kind of lithium borate compound different from lithium bis(oxalato) borate (chemical shift: 6.4 ppm).

The obtained product was subjected to mass spectrometry by ESI-MS. The results were as follows.

ESI-MS (neg.) measured value: m/z 114.98 [M-Li]$^-$

Mass spectrometry analysis confirmed that the mass of the anion species in the product corresponded to the mass of the anion species in Compound (II).

Furthermore, the obtained product was subjected to differential scanning calorimetry (DSC) measurements from room temperature to 600° C.

As a result, no melting point was observed in the obtained product, and a thermal decomposition behavior starting endothermic reaction at around 150° C. and showing an endothermic peak at 187° C. was observed.

As described above, the product obtained by Synthesis Example 5 was confirmed to be a kind of lithium borate compound, or Compound (II), from $^{13}$C-NMR analysis, $^{11}$B-NMR analysis, and ESI-MS measurements. Therefore, the results of Synthesis Example 5 indicated that Compound (II) was obtained by the following reaction scheme.

Synthesis Example 6 of Compound (II)

A treatment was carried out in the same manner as in Synthesis Example 1, except that the raw material for preparation was changed from 1.80 g (0.02 mol) of oxalic acid, 2.04 g (0.02 mol) of lithium oxalate, and 2.47 g (0.04 mol) of boric acid to 3.60 g (0.04 mol) of oxalic acid, 1.48 g (0.02 mol) of lithium carbonate, and 1.39 g (0.02 mol) of diboron trioxide. A treatment was performed by changing the solvent for slurry washing from 40 g of acetonitrile to 40 g of ethyl acetate. Eventually, 2.81 g of solid product was obtained.

The obtained product was dissolved in heavy dimethyl sulfoxide solvent, and $^{13}$C-NMR analysis and $^{11}$B-NMR analysis were carried out. The chemical shifts [ppm] of the spectra obtained by $^{13}$C-NMR and $^{11}$B-NMR analysis were as follows.

$^{13}$C-NMR: 161.3 ppm
$^{11}$B-NMR: 4.0 ppm

From $^{13}$C-NMR, a spectral pattern derived from an oxalic acid skeleton was confirmed, and from $^{11}$B-NMR, the obtained product was confirmed to be a kind of lithium borate compound different from lithium bis(oxalato) borate (chemical shift: 6.4 ppm).

The obtained product was subjected to mass spectrometry by ESI-MS. The results were as follows.

ESI-MS (neg.) measured value: m/z 114.98 [M-Li]$^-$

Mass spectrometry analysis confirmed that the mass of the anion species in the product corresponded to the mass of the anion species in Compound (II).

Furthermore, the obtained product was subjected to differential scanning calorimetry (DSC) measurements from room temperature to 600° C.

As a result, no melting point was observed in the obtained product, and a thermal decomposition behavior starting endothermic reaction at around 150° C. and showing an endothermic peak at 187° C. was observed.

As described above, the product obtained by Synthesis Example 6 was confirmed to be a kind of lithium borate compound, or Compound (II), from $^{13}$C-NMR analysis, $^{11}$B-NMR analysis, and ESI-MS measurements. Therefore, the results of Synthesis Example 6 indicated that Compound (II) was obtained by the following reaction scheme.

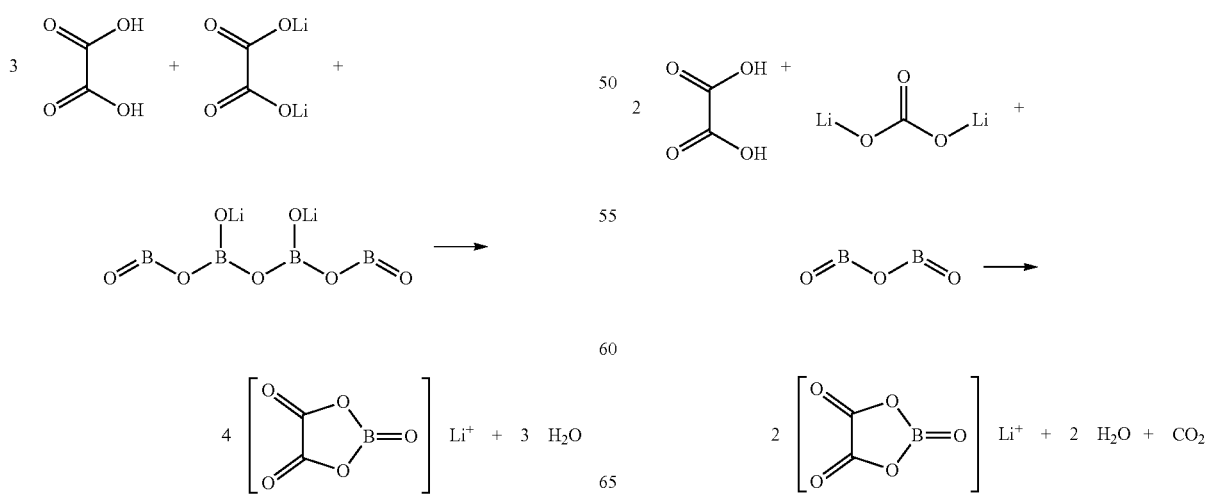

Synthesis Example 7 of Compound (II)

A treatment was carried out in the same manner as in Synthesis Example 1, except that the raw material for preparation was changed from 1.80 g (0.02 mol) of oxalic acid, 2.04 g (0.02 mol) of lithium oxalate, and 2.47 g (0.04 mol) of boric acid to 3.60 g (0.04 mol) of oxalic acid, and 1.99 g (0.04 mol) of lithium metaborate. A treatment was performed by changing the solvent for slurry washing from 40 g of acetonitrile to 40 g of ethyl acetate. Eventually, 2.83 g of solid product was obtained.

The obtained product was dissolved in heavy dimethyl sulfoxide solvent, and $^{13}$C-NMR analysis and $^{11}$B-NMR analysis were carried out. The chemical shifts [ppm] of the spectra obtained by $^{13}$C-NMR and $^{11}$B-NMR analysis were as follows.

$^{13}$C-NMR: 161.3 ppm $^{11}$B-NMR: 4.0 ppm

From $^{13}$C-NMR, a spectral pattern derived from an oxalic acid skeleton was confirmed, and from $^{11}$B-NMR, the obtained product was confirmed to be a kind of lithium borate compound different from lithium bis(oxalato) borate (chemical shift: 6.4 ppm).

The obtained product was subjected to mass spectrometry by ESI-MS. The results were as follows.

ESI-MS (neg.) measured value: m/z 114.98 [M-Li]$^-$

Mass spectrometry analysis confirmed that the mass of the anion species in the product corresponded to the mass of the anion species in Compound (II).

Furthermore, the obtained product was subjected to differential scanning calorimetry (DSC) measurements from room temperature to 600° C.

As a result, no melting point was observed in the obtained product, and a thermal decomposition behavior starting endothermic reaction at around 150° C. and showing an endothermic peak at 187° C. was observed.

As described above, the product obtained by Synthesis Example 7 was confirmed to be a kind of lithium borate compound, or Compound (II), from $^{13}$C-NMR analysis, $^{11}$B-NMR analysis, and ESI-MS measurements. Therefore, the results of Synthesis Example 7 indicated that Compound (II) was obtained by the following reaction scheme.

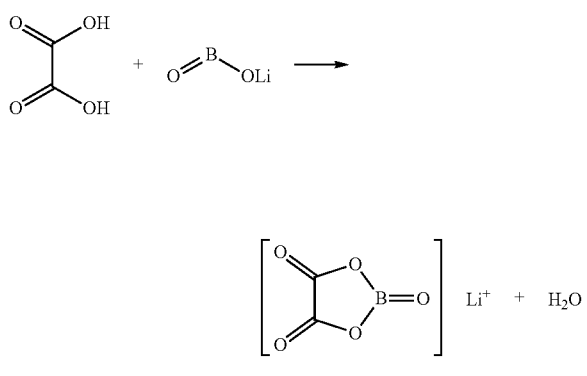

Examples 1 to 6, and Comparative Examples 1 to 4

<Preparation of Non-aqueous Electrolyte Solution (Samples 0 to 9)>

(Sample 0)

Ethylene carbonate (EC), dimethyl carbonate (DMC), and methyl ethyl carbonate (EMC) were mixed in the ratio of EC: DMC: EMC=30:35:35 (volume ratio) to prepare a mixed solvent as a non-aqueous solvent.

LiPF$_6$ as the electrolyte was dissolved in the mixed solvent to a concentration of 1 mole/liter in the eventually obtained non-aqueous electrolyte solution.

Sample 0 was thus obtained.

Sample 0 is a non-aqueous electrolyte solution used for the battery of Comparative Example 1.

(Samples 1 to 3)

Furthermore, Samples 1 to 3 were obtained in the same manner as in Sample 0, except that Compound (II), which is an example of the specific lithium borate compound, was added in such a manner that the content with respect to the total amount of the eventually obtained non-aqueous electrolyte solution was the content (% by mass) shown in Table 1.

Samples 1 to 3 are the non-aqueous electrolyte solutions used for the batteries in Examples 1 to 3, respectively.

(Sample 4)

Furthermore, Sample 4 was obtained in the same manner as in Sample 0, except that lithium bis(oxalato) borate (LiBOB) was added in such a manner that the content with respect to the total amount of the eventually obtained non-aqueous electrolyte solution was the content (% by mass) shown in Table 1.

Sample 4 is a non-aqueous electrolyte solution used in the battery of Comparative Example 2.

(Sample 5)

Furthermore, Sample 5 was obtained in the same manner as in Sample 0, except that vinylene carbonate (VC) was added in such a manner that the content with respect to the total amount of the eventually obtained non-aqueous electrolyte solution was the content (% by mass) shown in Table 1.

Sample 5 is a non-aqueous electrolyte solution used in the battery of Comparative Example 3.

(Samples 6 to 9)

Furthermore, Samples 6 to 9 were obtained in the same manner as in Samples 1 to 4, respectively, except that vinylene carbonate (VC) was added in such a manner that the content with respect to the total amount of the eventually obtained non-aqueous electrolyte solution was the content (% by mass) shown in Table 1.

Samples 6 to 8 are the non-aqueous electrolyte solutions used for the batteries in Examples 4 to 6, respectively.

Sample 9 is a non-aqueous electrolyte solution used in the battery of Comparative Example 4.

TABLE 1

|  | Compound (II) (% by mass) | LiBOB (% by mass) | VC (% by mass) | Sample No. |
|---|---|---|---|---|
| Comparative Example 1 | — | — | — | 0 |
| Example 1 | 0.10 | — | — | 1 |
| Example 2 | 0.25 | — | — | 2 |
| Example 3 | 0.50 | — | — | 3 |
| Comparative Example 2 | — | 0.50 | — | 4 |

TABLE 1-continued

| | Compound (II) (% by mass) | LiBOB (% by mass) | VC (% by mass) | Sample No. |
|---|---|---|---|---|
| Comparative Example 3 | — | — | 2.0 | 5 |
| Example 4 | 0.10 | — | 2.0 | 6 |
| Example 5 | 0.25 | — | 2.0 | 7 |
| Example 6 | 0.50 | — | 2.0 | 8 |
| Comparative Example 4 | — | 0.50 | 2.0 | 9 |

<Preparation of Lithium Secondary Battery>

A wound-type battery (design capacity of 1 Ah) (hereinafter, also simply referred to as "battery") as a lithium secondary battery was prepared as follows.

(Preparation of Positive Electrode)

1. Preparation of Positive Electrode Composite Material Slurry

A 5L-Planetary Despa was used to prepare a positive electrode composite material slurry.

After mixing 920 g of NCM523 (namely, $LiNi_{0.5}Co_{0.2}Mn_{0.3}O_2$) as a positive electrode active material, 20 g of Super-P (conductive carbon manufactured by TIMCAL Ltd.) as a conductive aid, and 20 g of KS-6 (flake graphite manufactured by TIMREX Ltd.) as a conductive aid for 10 minutes, 100 g of N-methylpyrrolidone (NMP) was added thereto, and the mixture was mixed for another 20 minutes.

Next, 150 g of 8%-PVDF solution (PVDFW #7200 manufactured by KUREHA CORPORATION dissolved in NMP) was added thereto and kneaded for 30 minutes, and then 200 g of the above-described 8%-PVDF solution was added thereto and kneaded for 30 minutes. Then, 80 g of the above-described 8%-PVDF solution was added and kneaded for 30 minutes. Thereafter, 27 g of NMP was added to adjust the viscosity and mixed for 30 minutes, and then vacuum defoaming was performed for 30 minutes.

A positive electrode composite material slurry with a solid concentration of 60% was thus obtained.

2. Coating, Drying, and Pressing

A die coater was used for coating the positive electrode composite material slurry.

The above-described positive electrode composite material slurry was coated onto a portion of one side of an aluminum foil (20 μm thick and 200 mm wide) as a positive electrode current collector to achieve a coating mass after drying of 19.0 mg/cm², and allowed to dry. Subsequently, the above-described positive electrode composite material slurry was coated onto a portion of the opposite (uncoated) side of the aluminum foil and dried in the same manner to achieve a coating mass of 19.0 mg/cm².

The thus obtained aluminum foil with both sides coated (38.0 mg/cm²) was dried in a vacuum drying oven at 130° C. for 12 hours, and then compressed in a 35-ton press to achieve a press density of 2.9 g/cm³ to obtain a positive electrode raw material.

This positive electrode raw material includes an aluminum foil as a positive electrode current collector and positive electrode composite material layers provided on both sides of the aluminum foil. Both sides of the aluminum foil include, respectively, an area in which the positive electrode composite material layer was formed and an area in which the positive electrode composite material layer was not formed (namely, a margin).

3. Slit

By slitting the above-described positive electrode raw material, a positive electrode C-1 was obtained, which includes a 56 mm×334 mm positive electrode composite material layer and a tab welding margin on the front side, and a 56 mm×408 mm positive electrode composite material layer and a tab welding margin on the back side.

(Preparation of Negative Electrode)

1. Preparation of Negative Electrode Composite Material Slurry

A 5L-Planetary Despa was used to prepare a negative electrode composite material slurry.

To 960 g of natural graphite as a negative electrode active material and 10 g of Super-P (conductive carbon, 62 m²/g BET specific surface area) as a conductive aid, 450 g of 1%-CMC aqueous solution (namely, 1% by mass of carboxymethylcellulose (CMC) aqueous solution) was added and mixed for 30 minutes.

To the obtained mixture, 300 g of 1%-CMC aqueous solution was added and kneaded for 30 minutes, and then 250 g of 1%-CMC aqueous solution was added and kneaded for another 30 minutes.

To the obtained mixture, 50 g of styrene-butadiene rubber (SBR) (40% emulsified liquid) was added and mixed for 30 minutes, and then vacuum defoaming was performed for 30 minutes.

A negative electrode composite material slurry with a solid concentration of 45% was thus prepared.

2. Coating, Drying, and Pressing

A die coater was used for coating the negative electrode composite material slurry.

The above-described negative electrode composite material slurry was coated onto a portion of one side of a copper foil (10 μm thick) as a negative electrode current collector to achieve a coating mass after drying of 11.0 mg/cm², and allowed to dry. Subsequently, the above-described negative electrode composite material slurry was coated onto a portion of the opposite (uncoated) side of the copper foil and dried in the same manner to achieve a coating mass of 11.0 mg/cm².

The thus obtained copper foil with both sides coated (22.0 mg/cm²) was dried in a vacuum drying oven at 120° C. for 12 hours, and then compressed in a small press to achieve a press density of 1.45 g/cm³ to obtain a negative electrode raw material.

This negative electrode raw material includes a copper foil as a negative electrode current collector and negative electrode composite material layers provided on both sides of the copper foil. Both sides of the copper foil include, respectively, an area in which the negative electrode composite material layer was formed and an area in which the negative electrode composite material layer was not formed (namely, a margin).

3. Slit

By slitting the above-described negative electrode raw material, a negative electrode A-1 was obtained, which includes a 58 mm×372 mm negative electrode composite material layer and a tab welding margin on the front side, and a 58 mm×431 mm negative electrode composite material layer and a tab welding margin on the back side.

(Preparation of Battery Precursor)

As a separator, a porous resin sheet (porous polyethylene film with a porosity of 45% and a thickness of 25 μm) (60.5 mm×450 mm) was prepared.

A layered body was obtained by stacking the negative electrode A-1, the separator, and positive electrode C-1 with the back side of the negative electrode A-1 in contact with the separator and the back side of the positive electrode C-1 in contact with the separator. The obtained layered body was wound up to obtain a wound body. The obtained wound body was pressed and formed to obtain a molded body.

Subsequently, an aluminum positive electrode tab was bonded to a marginal portion of the positive electrode C-1 in the above-described molded body using an ultrasonic bonding machine, and a nickel negative electrode tab was bonded to a marginal portion of the negative electrode A-1 in the above-described molded body using an ultrasonic bonding machine. The molded body with the positive electrode tab and the negative electrode tab bonded was sandwiched between a pair of laminated sheets, and then heat-sealed on three sides to obtain a laminated body. In this case, the positive electrode tab and the negative electrode tab were made to protrude from a remaining side (a side not heat-sealed) in the laminated body.

Subsequently, the above-described laminated body was dried at 70° C. for 12 hours under reduced pressure using a vacuum dryer while vacuuming. Subsequently, a non-aqueous electrolyte solution (any one of Samples 0 to 9) was injected into the interior of the above-described laminated body from the above-described remaining one side of the laminated body while continuing the vacuuming, and then the above-described remaining one side of the laminated body was heat-sealed. The amount of electrolyte solution injected was 4.7 g.

Battery precursors (namely, lithium secondary battery precursors) of Examples and Comparative Examples were thus obtained.

(Preparation of Battery (Aging Treatment))

The battery precursors of Examples and Comparative Examples were subjected to the following aging treatment to obtain batteries (namely, lithium secondary batteries) of Examples and Comparative Examples. The details are described below.

A battery precursor was held for 12 hours at an ambient temperature of 40° C.

Subsequently, under an ambient temperature of 40° C., the battery precursor was subjected to a constant current charge at a charging rate of 0.05 C to 3.0 V, followed by a constant current charge at a charging rate of 0.1 C to 3.4 V, followed by a constant current charge at a charging rate of 0.24 C to 3.7 V.

Subsequently, the battery precursor was allowed to be quiescent for 24 hours under an ambient temperature of 40° C.

Subsequently, under an ambient temperature of 40° C., the battery precursor was subjected to charging at a constant current constant voltage at a charging rate of 0.5 C (0.5 C-CCCV) to 4.2 V (100% SOC (State Of Charge)), followed by a quiescence for 30 minutes, followed by discharging at a constant current at a discharging rate of 0.5 C (0.5 C-CC) to 3.0 V.

Subsequently, the battery precursor was subjected to charging at 0.5 C-CCCV to 4.2 V, followed by discharging at 0.5 C-CC to 3.7 V, followed by charging at CCCV to 4.2 V.

Subsequently, the battery precursor was stored under an ambient temperature of 40° C. for 7 days.

A battery was thus obtained.

<Evaluation Positive Electrode Resistance and Negative Electrode Resistance of Battery>

The positive electrode resistance and the negative electrode resistance for batteries of Examples and Comparative Examples were evaluated. The details are described below.

The SOC of a battery was adjusted to 50%, and the Bode-Plot was measured at 25° C. under this condition. The measurement was performed using a Bio-Logic VSP-300.

Specifically, the frequency was varied from 0.1 Hz to 6 MHz and the Bode-Plot was determined from the resistance of the imaginary part and the response frequency.

From the obtained Bode-Plot, the resistance at 10 Hz (EIS-Z") was extracted as the positive electrode resistance ($\Omega$), and the resistance at 1 KHz (EIS-Z") was extracted as the negative electrode resistance ($\Omega$).

The above-described measurement was performed before storing the battery (0 weeks of storage), after storing the battery for 1 week (1 week of storage), after storing the battery for 2 weeks (2 weeks of storage), after storing the battery for 3 weeks (3 weeks of storage), and after storing the battery for 4 weeks (4 weeks of storage).

Here, the storage conditions of a battery were set to store the battery in an environment of 60° C.

The results above are shown in Table 2 and Table 3.

TABLE 2

| | Positive electrode resistance ($\Omega$) | | | | | Negative electrode resistance ($\Omega$) | | | | |
|---|---|---|---|---|---|---|---|---|---|---|
| Number of weeks of storage | 0 | 1 week | 2 weeks | 3 weeks | 4 weeks | 0 | 1 weeks | 2 weeks | 3 weeks | 4 weeks |
| Comparative Example 1 | 0.08 | 0.17 | 0.23 | 0.26 | 0.23 | 0.19 | 0.17 | 0.18 | 0.19 | 0.18 |
| Example 1 | 0.08 | 0.14 | 0.20 | 0.21 | 0.20 | 0.18 | 0.16 | 0.19 | 0.18 | 0.19 |
| Example 2 | 0.09 | 0.12 | 0.18 | 0.21 | 0.17 | 0.21 | 0.18 | 0.21 | 0.20 | 0.20 |
| Example 3 | 0.10 | 0.11 | 0.15 | 0.16 | 0.15 | 0.24 | 0.19 | 0.21 | 0.19 | 0.21 |
| Comparative Example 2 | 0.09 | 0.08 | 0.11 | 0.15 | 0.17 | 0.24 | 0.15 | 0.15 | 0.17 | 0.18 |

TABLE 3

| | Positive electrode resistance ($\Omega$) | | | | | Negative electrode resistance ($\Omega$) | | | | |
|---|---|---|---|---|---|---|---|---|---|---|
| Number of weeks of storage | 0 | 1 week | 2 weeks | 3 weeks | 4 weeks | 0 | 1 week | 2 weeks | 3 weeks | 4 weeks |
| Comparative Example 3 | 0.09 | 0.21 | 0.29 | 0.37 | 0.41 | 0.22 | 0.25 | 0.30 | 0.35 | 0.42 |
| Example 4 | 0.13 | 0.30 | 0.40 | 0.40 | 0.40 | 0.27 | 0.33 | 0.42 | 0.52 | 0.42 |
| Example 5 | 0.21 | 0.30 | 0.36 | 0.35 | 0.36 | 0.32 | 0.35 | 0.41 | 0.46 | 0.41 |
| Example 6 | 0.24 | 0.30 | 0.36 | 0.34 | 0.36 | 0.35 | 0.36 | 0.42 | 0.45 | 0.42 |
| Comparative Example 4 | 0.17 | 0.18 | 0.24 | 0.30 | 0.31 | 0.28 | 0.26 | 0.29 | 0.33 | 0.37 |

Figure 2:
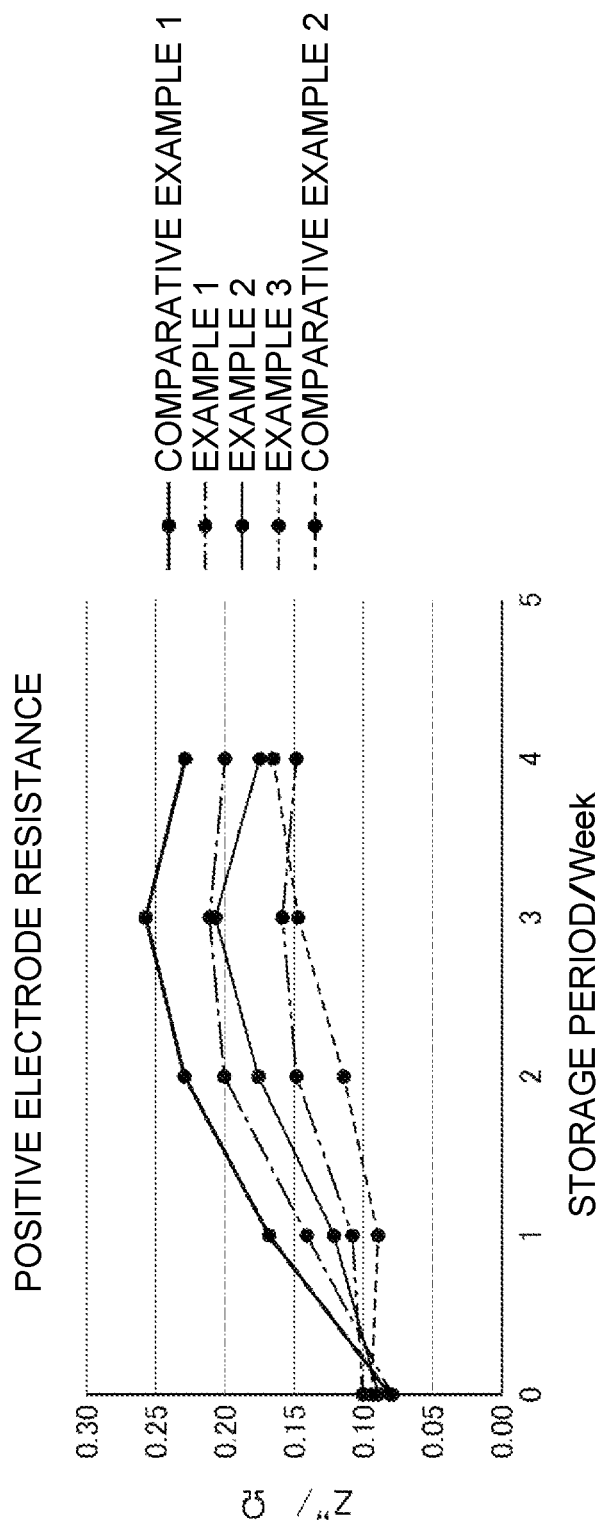
FIG. 2 is a graph illustrating the relationship between the storage period and the positive electrode resistance of the batteries in Examples 1 to 3 and Comparative Examples 1 and 2.
Figure 3:
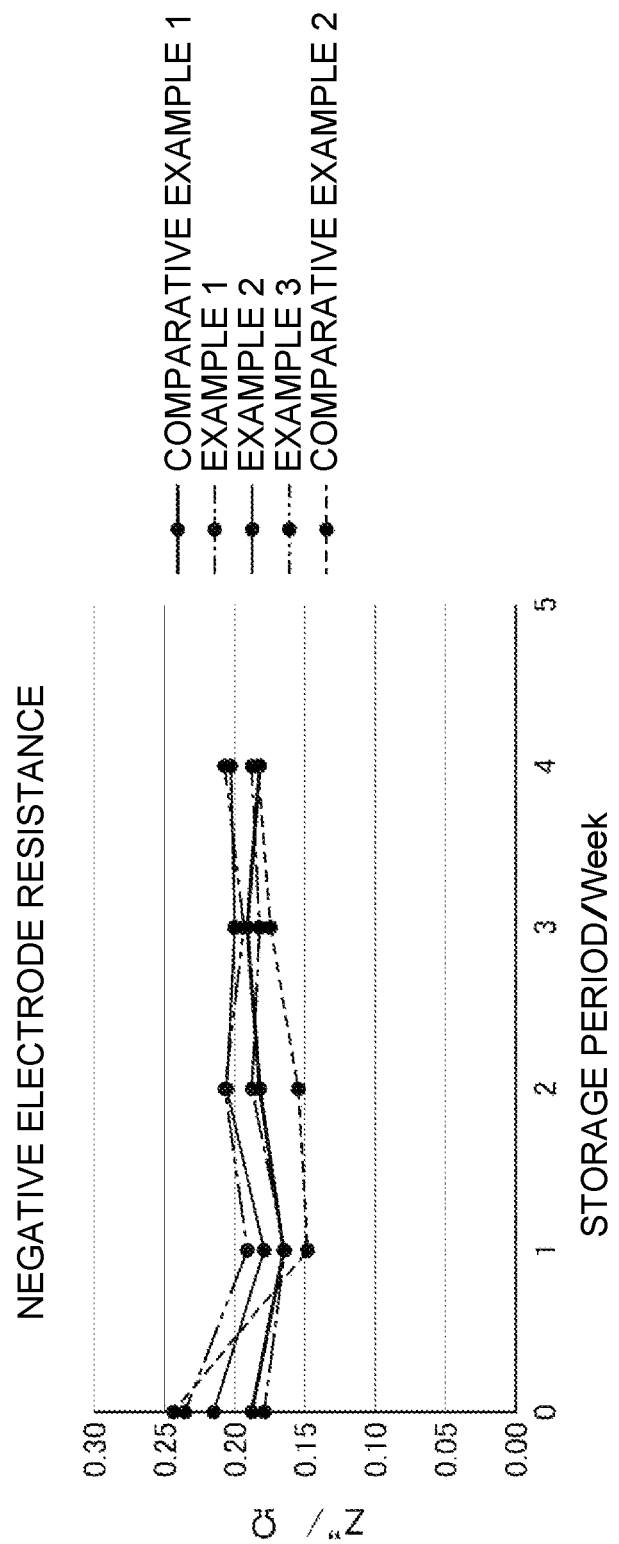
FIG. 3 is a graph illustrating the relationship between the storage period and the negative electrode resistance of the batteries in Examples 1 to 3 and Comparative Examples 1 and 2.
Figure 4:
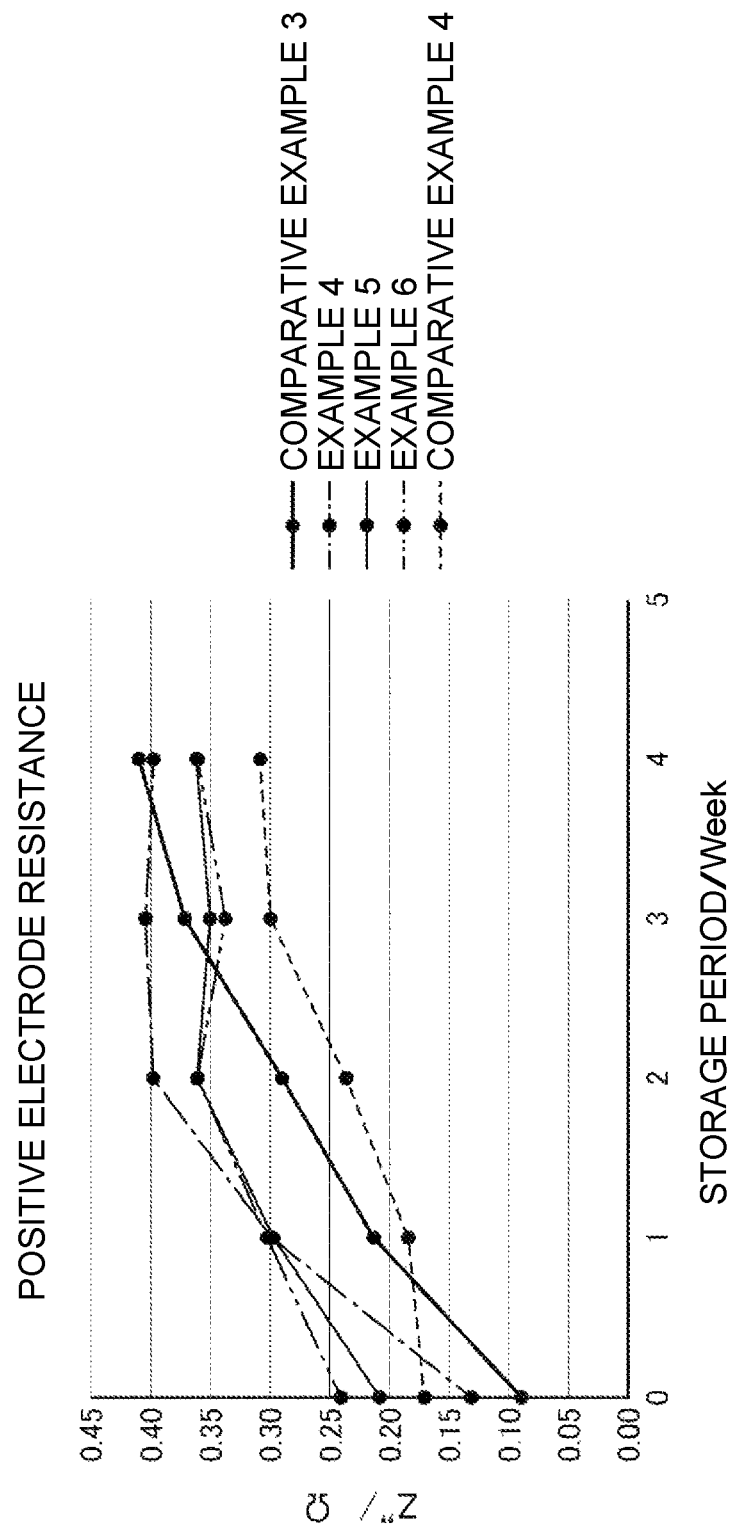
FIG. 4 is a graph illustrating the relationship between the storage period and the positive electrode resistance of the batteries in Examples 4 to 6 and Comparative Examples 3 and 4.
Figure 5:
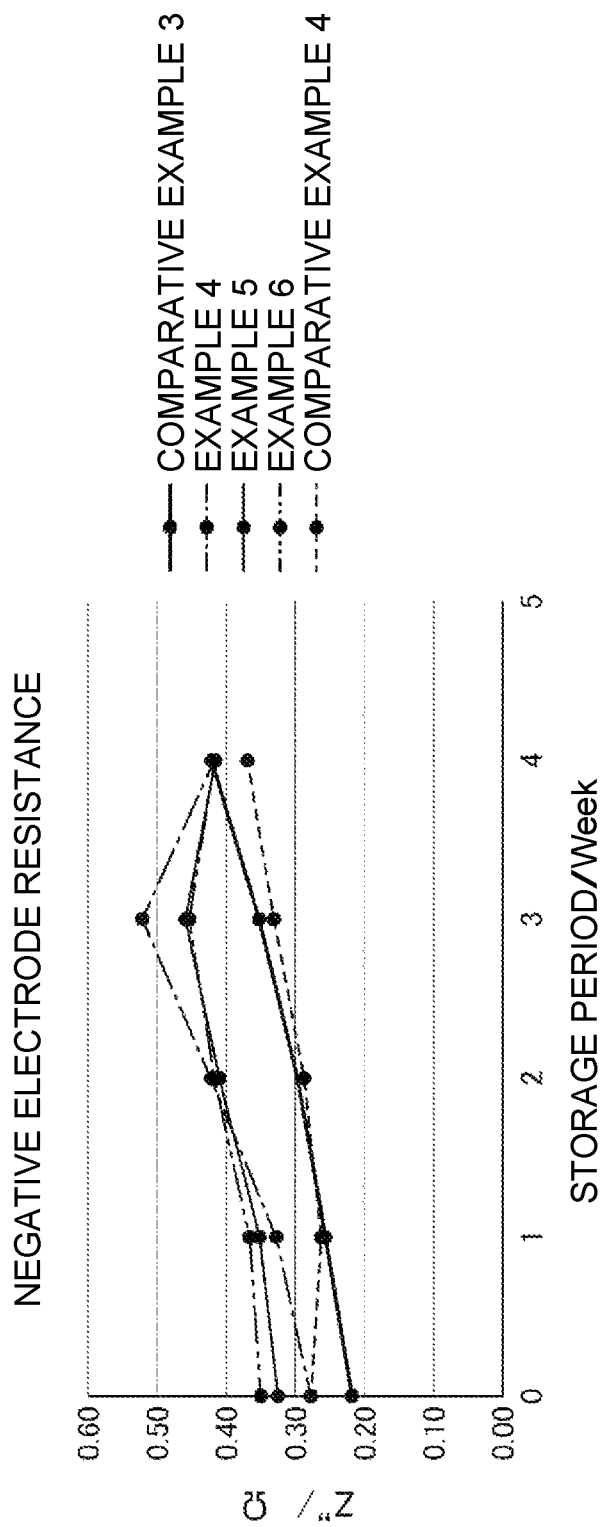
FIG. 5 is a graph illustrating the relationship between the storage period and the negative electrode resistance of the batteries in Examples 4 to 6 and Comparative Examples 3 and 4.

FIG. 2 is a graphical representation of the positive electrode resistance in Table 2;

FIG. 3 is a graphical representation of the negative electrode resistance in Table 2;

FIG. 4 is a graphical representation of the positive electrode resistance in Table 3; and FIG. 5 is a graphical representation of the negative electrode resistance in Table 3.

Regarding Positive Electrode Resistance

As shown in Table 2 and FIG. 2, the positive electrode resistances in Examples 1 to 3 are all lower than those in Comparative Example 1 in the region where the storage period is one week or more.

From the above, it was confirmed that the positive electrode resistance was reduced by containing the specific lithium borate compound in a non-aqueous electrolyte solution.

Furthermore, as shown in Table 2 and FIG. 2, in Comparative Example 2 with LiBOB, the positive electrode resistance decreased and was the lowest at the first week of storage than immediately after storage, and after one week, the resistance tended to gradually increase.

In contrast, the positive electrode resistance in Examples 1 to 3 showed a tendency to gradually increase up to the end of 3 weeks, and after 4 weeks, the resistance showed a tendency to decrease than that at 3 weeks. In particular, in Example 3, the positive electrode resistance was lower than that of Comparative Example 2 after 4 weeks. In Examples 1 and 2, the positive electrode resistance is expected to be lower than that of Comparative Example 2 when the storage period is further extended than 4 weeks.

These results confirmed that containing the specific lithium borate compound in a non-aqueous electrolyte solution can reduce the increase rate of the positive electrode resistance of the lithium secondary battery with respect to the storage period of the lithium secondary battery when the lithium secondary battery is stored for a certain period of time (specifically, two to three weeks) and then stored further.

This is thought to be because when a non-aqueous electrolyte solution contains the specific lithium borate compound, an inorganic component adheres to the surface of a positive electrode due to chemical reactions in addition to electrochemical reactions when the storage period of a lithium secondary battery is more than a certain amount of time.

Table 3 and FIG. 4 show the positive electrode resistance in Examples and Comparative Examples using a non-aqueous electrolyte solution containing VC.

As shown in Table 3 and FIG. 4, in Examples 4 to 6, the increase rate of the positive electrode resistance is stable with a tendency of saturation in the region where the storage period is two weeks or more, whereas in Comparative Example 3, the initial positive electrode resistance is low, and thereafter, the positive electrode resistance tends to increase even in the region where the storage period is two weeks or more. Therefore, it can be seen that the increase in the storage period in Comparative Example 3 may lead to an increase in the positive electrode resistance.

From these results, it was confirmed that the increase of the positive electrode resistance of a lithium secondary battery with respect to the storage period of the lithium secondary battery can be reduced by adding the specific lithium borate compound to a non-aqueous electrolyte solution even when the non-aqueous electrolyte solution contains VC, even when the lithium secondary battery is stored for a certain period of time (specifically, two weeks) and then stored further.

Furthermore, as shown in Table 3 and FIG. 4, the positive electrode resistance in Comparative Example 4 using VC and LiBOB showed a tendency to gradually increase even after two weeks, although the positive electrode resistance was relatively low.

In contrast, the positive electrode resistance in Examples 4 to 6 showed a tendency to gradually increase up to two weeks, and after two weeks, the resistance showed a tendency to decrease or saturate compared to the value at two weeks.

These results confirmed that further containing the specific lithium borate compound in a non-aqueous electrolyte solution containing VC can reduce the increase rate of the positive electrode resistance of the lithium secondary battery with respect to the storage period of the lithium secondary battery when the lithium secondary battery is stored for a certain period of time (specifically, two weeks) and then stored further.

The tendency to suppress the positive electrode resistance in Examples 1 to 6 is more pronounced when the content of the specific lithium borate compound (here, Compound (II)) is higher.

It can be seen that the content of the specific lithium borate compound with respect to the total amount of the non-aqueous electrolyte solution is preferably 0.25% by mass or more, for example.

Regarding Negative Electrode Resistance

As shown in Table 2 and FIG. 3, the negative electrode resistance in Examples 1 to 3 is higher than the negative electrode resistance of Comparative Examples 1 and 2 until a storage period of two weeks passed, and in the region where the storage period is more than two weeks, both values are maintained at the same level as Comparative Examples 1 and 2.

Therefore, it can be seen that when the non-aqueous electrolyte solution contains the specific lithium borate compound, the possibility of increasing the negative electrode resistance was reduced.

In Comparative Example 2 using a non-aqueous electrolyte solution containing LiBOB, the negative electrode resistance was lower at the first week of storage than immediately after storage, and was the lowest, and after one week, the negative electrode resistance showed a tendency to gradually increase.

In contrast, the negative electrode resistance in Examples 1 to 3 shows a tendency to increase up to 2 weeks, and after 3 weeks, the negative resistance shows a tendency to decrease compared to the value at 2 weeks.

From these results, it can be seen that when a non-aqueous electrolyte solution contains the specific lithium borate compound, the possibility of an increase in negative electrode resistance is further reduced when a storage period of more than a certain amount of time is secured.

Table 3 and FIG. 5 illustrate the negative electrode resistance of Examples and Comparative Examples using a non-aqueous electrolyte solution containing VC.

As shown in Table 3 and FIG. 5, the negative resistance in Examples 4 to 6 shows a tendency of saturation of the increase rate of the negative electrode resistance after a storage period of more than 3 weeks, and the negative resistance at 4 weeks is lower compared to the value at 3 weeks. In contrast, in Comparative Example 3, the initial negative electrode resistance is low, and then increases, and it can be seen that an increase in the storage period may lead to an increase in the negative electrode resistance.

Therefore, it can be seen that a non-aqueous electrolyte solution containing the specific lithium borate compound can inhibit the increase of the negative electrode resistance, especially when the storage period is more than a certain amount of time. In particular, it can be seen that the tendency of the increase in negative electrode resistance can be suppressed more effectively when the non-aqueous electrolyte solution contains VC.

In Comparative Example 4 using a non-aqueous electrolyte solution containing VC and LiBOB, the negative electrode resistance is relatively low, and after one week, the resistance tends to increase gradually.

In contrast, the negative electrode resistance in Examples 4 to 6 shows a tendency to increase gradually up to 3 weeks, and after 4 weeks, the negative electrode resistance tends to decrease compared to the value after 3 weeks.

From these results, it can be seen that when the non-aqueous electrolyte solution contains the specific lithium borate compound, the negative electrode resistance can be further reduced by ensuring a certain amount of storage period. This is because the ratio of the organic component to the inorganic component in the negative electrode film becomes more stable due to chemical reactions in addition to electrochemical reactions by ensuring a certain amount of storage period.

The tendency to suppress the negative electrode resistance in Examples 1 to 6 is more pronounced when the content of the specific lithium borate compound (here, Compound (II)) is higher.

It can be seen that the content of the specific lithium borate compound in the total amount of the non-aqueous electrolyte solution is preferably 0.25% by mass, for example.

<Evaluation DC Resistance of Battery>

For the batteries of Examples 1 to 6 and Comparative Examples 1 and 3, the DC resistance was evaluated as the internal resistance of the batteries.

The details are described below.

The following operations were performed at 25° C.

The SOC of a battery was adjusted to 50%.

The battery adjusted to 50% SOC was subjected to CC10s discharge at a discharging rate of 0.2C, followed by CC-CV10s charging at a charging rate of 0.2C.

Subsequently, the battery was subjected to CC10s discharging at a discharging rate of 1C, followed by CC-CV10s charging at a discharging rate of 1C.

Subsequently, the battery was subjected to CC10s discharging at a discharging rate of 2C, followed by CC-CV10s charging at a charging rate of 2C.

Subsequently, the battery was subjected to CC10s discharging at a discharging rate of 5C, followed by CC-CV10s charging at a charging rate of 5C.

CC10s discharging means discharging at Constant Current for 10 seconds, and CC-CV10s charging means charging at Constant Current-Constant Voltage (CC-CV10s) for 10 seconds.

The DC resistance was determined from each charging and discharging quiescent current and each charging and discharging quiescent voltage, and the DC obtained resistance was used as the initial DC resistance of the battery.

After storing the battery at 60° C. for one week and after storing the battery at 60° C. for two weeks, the DC resistance was determined using the above-described method, and the obtained DC resistance values were defined as the DC resistance value after one week of battery storage and the DC resistance value after two weeks of battery storage, respectively.

The relative values of DC resistance after 1 week of battery storage and DC resistance after 2 weeks of battery storage were determined with the initial DC resistance of the battery set at 100.0.

The results are shown in Table 4.

In Table 4, the initial DC resistance is shown as 100.0, and then the above-described relative values of the DC resistance after one week of storage (namely, the relative value when the initial DC resistance is set to 100.0) and the above-described relative values of the DC resistance after two weeks of storage (namely, the relative value when the initial DC resistance is set to 100.0) are shown in Table 4.

The above-described relative value of DC resistance after one week of storage and the above-described relative value of DC resistance after two weeks of storage correspond to the increase rate (%) of DC resistance due to storage (hereinafter, also simply referred to as "resistance increase rate"). The increase rate herein refers to an increase rate that is expressed as 100% when the resistance does not rise and does not fall, expressed as more than 100% when the resistance rises, and expressed as less than 100% when the resistance falls.

The reason for focusing on the resistance increase rate is that while a low resistance value itself is an important aspect of battery performance, a reduction in the resistance increase rate caused by degradation over the storage period is also considerably important.

TABLE 4

|  | Additive | | | Relative value of DC resistance (resistance increase rate) | |
| --- | --- | --- | --- | --- | --- |
|  | X (wt. %) | VC (wt. %) | Initial | After 1 week of storage | After 2 weeks of storage |
| Comparative Example 1 | — | — | 100.0 | 122.3 | 144.8 |
| Example 1 | 0.10 | — | 100.0 | 118.3 | 140.3 |
| Example 2 | 0.25 | — | 100.0 | 113.3 | 135.5 |
| Example 3 | 0.50 | — | 100.0 | 112.5 | 129.8 |
| Comparative Example 3 | — | 2.00 | 100.0 | 146.7 | 176.6 |
| Example 4 | 0.10 | 2.00 | 100.0 | 142.0 | 180.2 |
| Example 5 | 0.25 | 2.00 | 100.0 | 126.3 | 157.8 |
| Example 6 | 0.50 | 2.00 | 100.0 | 117.6 | 138.9 |

* X means Compound (II).

Figure 6:
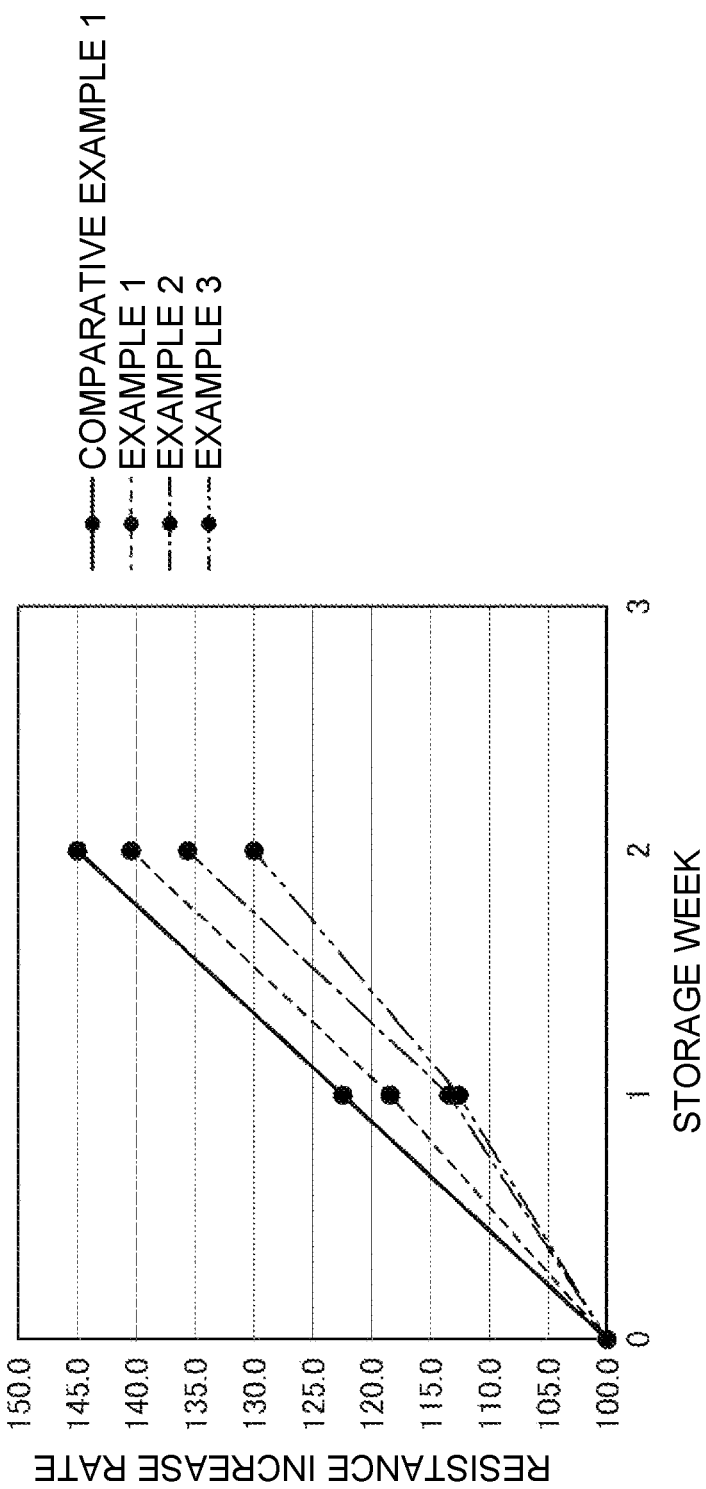
FIG. 6 is a graph illustrating the relationship between the storage week and the resistance increase rate in Examples 1 to 3 and Comparative Example 1.
Figure 7:
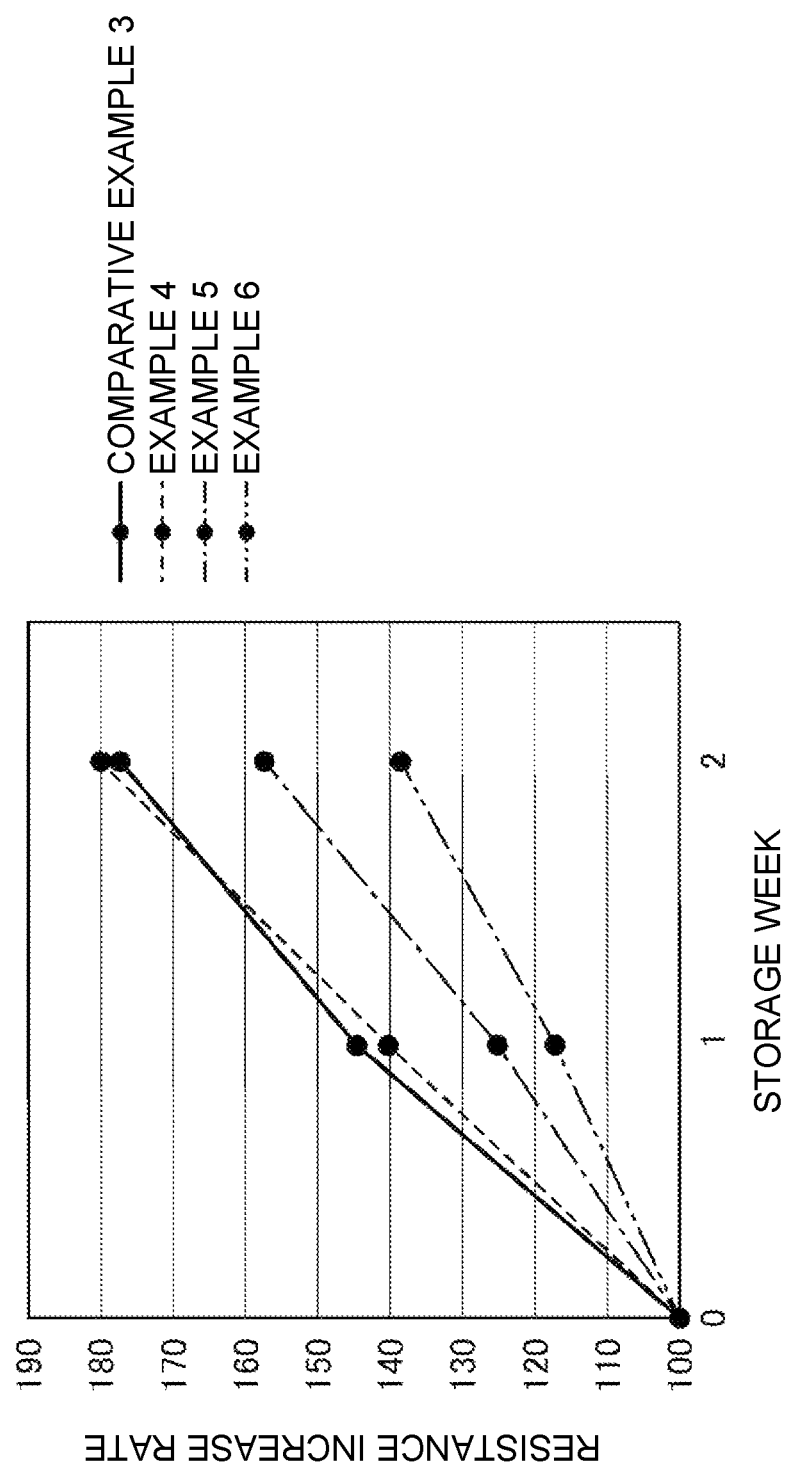
FIG. 7 is a graph illustrating the relationship between the storage week and the resistance increase rate in Examples 4 to 6 and Comparative Example 3.

FIG. 6 is a graphical representation of the resistance increase rate of an example using a non-aqueous electrolyte solution not containing VC in Table 4 (namely, Examples 1 to 3 and Comparative Example 1); and FIG. 7 is a graphical representation of the resistance increase rate of an example using a non-aqueous electrolyte solution containing VC in Table 4 (namely, Examples 4 to 6 and Comparative Example 3).

As shown in Table 4 and FIG. 6, Examples 1 to 3 using a non-aqueous electrolyte solution containing the specific lithium borate compound (specifically Compound (II)) had a reduced resistance increase rate compared to Comparative Example 1 using a non-aqueous electrolyte solution not containing the specific lithium borate compound.

From Examples 1 to 3, it can be seen that the resistance increase rate is reduced as the content of the specific lithium borate compound is increased.

As shown in Table 4 and FIG. 7, Examples 4 to 6 using a non-aqueous electrolyte solution containing VC and the specific lithium borate compound (specifically Compound (II)) had a reduced resistance increase rate compared to Comparative Example 3 using a non-aqueous electrolyte solution containing VC and not containing the specific lithium borate compound.

From Examples 4 to 6, it can be seen that the resistance increase rate is reduced as the content of the specific lithium borate compound is increased.

In particular, when the content mass ratio [specific lithium borate compound/vinylene carbonate] (namely, the value obtained by dividing the content mass of the specific lithium borate compound by the content mass of the vinylene carbonate) is 0.125 or more (Examples 5 and 6), the resistance increase rate is further reduced.

For example, focusing on Comparative Example 1 (no VC, 122.3 DC resistance one week after storage) and Comparative Example 3 (with VC, 146.7 DC resistance one week after storage), it can be seen that the DC resistance after storage tends to increase more easily when the non-aqueous electrolyte solution contains VC and does not contain the specific lithium borate compound (Comparative Example 3) than when the non-aqueous electrolyte solution does not contain VC and does not contain the specific lithium borate compound (Comparative Example 1).

Here, further focusing on Example 3 (no VC, 112.5 DC resistance after one week of storage) and Example 6 (VC, 117.6 DC resistance after one week of storage), it can be seen that the reduction in DC resistance by the specific lithium borate compound is greater (namely, the effect of the specific lithium borate compound is more pronounced) when the non-aqueous electrolyte solution contains VC (Example 6) compared to when the non-aqueous electrolyte solution does not contain VC (Example 3). Specifically, the range of the reduction in DC resistance by the specific lithium borate compound when the non-aqueous electrolyte solution does not contain VC is 9.8 (=122.3-112.5), whereas the range of the reduction in DC resistance by the specific lithium borate compound when the non-aqueous electrolyte solution contains VC is 29.1 (=146.7-117.6).

<Evaluation of Electrical Conductivity of Non-aqueous Electrolyte Solution>

The electrical conductivity of a non-aqueous electrolyte solution was evaluated to confirm an action of the specific lithium borate compound in the non-aqueous electrolyte solution.

As the non-aqueous electrolyte solution, the above-described Sample 0 (0% by mass of Compound (II)), Sample 1 (0.10% by mass of Compound (II)), Sample 2 (0.25% by mass of Compound (II)), Sample 3 (0.50% by mass of Compound (II)), and Sample 10 below (1.0% by mass of Compound (II)) were used.

Sample 10 was prepared in the same manner as in Sample 0, except that Compound (II) was added in such a manner that the content of Compound (II) was 1.0% by mass of the total amount of the eventually obtained non-aqueous electrolyte solution.

The details of the evaluation are described below.

To the non-aqueous electrolyte solution, a mixed solvent in an amount of 9 times the mass of the above-described mixed solvent in the non-aqueous electrolyte solution (namely, a mixed solvent of EC: DMC: EMC=30:35:35 (volume ratio)) was added and then stirred at 500 rpm for a day or more to obtain a diluted electrolyte solution. By this operation, the electrical conductivity of the non-aqueous electrolyte solution to be measured was adjusted to be within the measurable range of the electrical conductivity meter to be described below.

The electrical conductivity of the obtained diluted electrolyte solution was measured by a CM-20J electrical conductivity meter (manufactured by DKK TOA Corporation). In detail, 20 mL of the diluted electrolyte solution was poured into a polypropylene (PP) container, and the temperature probe and conductivity probe of the electrical conductivity meter were immersed in the diluted electrolyte solution in the PP container. The temperature of the diluted electrolyte solution was adjusted in this state, and the electrical conductivity of the diluted electrolyte solution at the following measurement temperature was determined as the electrical conductivity of the diluted electrolyte solution.

The measurement temperature was set at three points 25° C., 0° C., and −30° C.

The results are shown in FIG. 8.

FIG. 8 is a graph illustrating the relationship between the content of the specific lithium borate in the non-aqueous electrolyte solution before dilution and the change rate (%) of the electrical conductivity.

The change rate (%) herein refers to a change rate (%) of an aspect in which the value that does not increase and does not decrease is expressed as 100%, the value that increases is expressed as more than 100%, and the value that decreases is expressed as less than 100%.

As shown in FIG. 8, at a measurement temperature of −30° C., both Sample 1 and Sample 2 showed no increase or change in electrical conductivity, whereas Sample 3 and Sample 10 showed a decrease in the change rate of the electrical conductivity.

While the decrease in the electrical conductivity of Sample 1 was considerably small at a measurement temperature of 25° C. and a measurement temperature of 0° C., there was a decrease of about 1% in the electrical conductivity of Sample 2. This decrease in electrical conductivity was especially pronounced in Samples 3 and 10 (namely, samples with a high content of specific lithium borate).

The reason for the decrease in the electrical conductivity is considered to be due to the coordination of the specific lithium borate to lithium ions and suppression of the mobility of lithium ions.

From these results, it was confirmed that the specific lithium borate compound had the ability to coordinate to lithium ion in a non-aqueous electrolyte solution.

<Analysis of Boron Content on Surface of Positive Electrode and Surface of Negative Electrode>

In order to examine a reaction of a battery on the surface of a positive and the surface of a negative electrode during storage, the following experiments were carried out.

Specifically, using the batteries of Comparative Example 1 and Examples 2 and 3, the relationship between the content of the specific lithium borate compound in a non-aqueous electrolyte solution used to prepare a battery and the content of boron on the surface of the positive electrode and the surface of the negative electrode was examined.

Both the boron content on the surface of the positive electrode and the boron content on the surface of the negative electrode were measured by disassembling a battery before storage and a battery after 4 weeks of storage (at 60° C. storage temperature).

Here, the surface of the positive electrode is the surface of a positive electrode composite material layer of the positive electrode, and the surface of the negative electrode is the surface of the negative electrode composite material layer of the negative electrode.

The boron content on the surface of the positive electrode was determined by
(1) dissolving powder of the positive electrode composite material layer peeled off from the positive electrode in concentrated nitric acid and concentrated sulfuric acid to obtain a solution,
(2) diluting the obtained solution with water and then accelerating the dissolution by microwave irradiation to uniformly disperse the solution to obtain an aqueous solution, and
(3) quantitatively analyzing the boron in the obtained aqueous solution by ICP optical emission spectrometry.

The boron content on the surface of the negative electrode was determined by
(1) burning powder of a negative electrode composite material layer peeled off from the negative electrode in a closed flask and then dispersing the powder in an acid solution that is an absorption solution to obtain a solution, and
(2) quantitatively analyzing the boron in the obtained solution by ICP optical emission spectrometry.

These results are shown in Table 5.

In Table 5, the unit [μg/g] represents the boron content per gram of a sample (powder of a positive electrode composite material layer or powder of a negative electrode composite material layer).

In Example 3, despite the fact that the content of Compound (II) in the non-aqueous electrolyte solution is twice as high as in Example 2, the increase rate of boron in the negative electrode before and after storage in Example 2 (about 3.1 times) is greater than the increase rate of boron in the negative electrode before and after storage in Example 3 (about 2.4 times).

Here, considering that a negative electrode film is formed when a state in which an additive is easy to decompose and a place in which the additive is easy to decompose (hereinafter, also referred to as "reaction site") coincide, when a battery is stored for four weeks in a state of sufficiently easy decomposition, if a reaction site is secured, the boron content after storage should increase in proportion to the increase in the content of Compound (II).

However, as described above, in Example 3, in which the content of Compound (II) is doubled from Example 2, the boron increase rate is smaller than the boron increase rate in Example 2.

This indicates that the boron content on the surface of the negative electrode tends to be saturated at a predetermined amount depending on the number of reaction sites in the negative electrode.

Next, in Example 2 after storage, an increase of about 36% in boron was observed in the positive electrode compared to Example 2 before storage, and in Example 3 after

TABLE 5

|  | Compound (II) content (% by mass) | Boron content (surface of negative electrode) | | | Boron content (surface of positive electrode) | | |
|---|---|---|---|---|---|---|---|
|  |  | Before storage (μg/g) | After 4 weeks of storage (μg/g) | Increase rate After 4 weeks of storage/before storage | Before storage (μg/g) | After 4 weeks of storage (μg/g) | Increase rate After 4 weeks of storage/before storage |
| Comparative Example 1 | 0.00 | 0 | 0 | — | 0 | 0 | — |
| Example 2 | 0.25 | 86 | 270 | 3.14 | 50 | 68 | 1.36 |
| Example 3 | 0.50 | 190 | 460 | 2.42 | 77 | 81 | 1.05 |

As shown in Table 5, no boron was detected on the surface of the positive electrode and no boron was detected on the surface of the negative electrode in Example 1 before storage (namely, immediately after battery preparation). The same was true after 4 weeks of storage.

In contrast, in Examples 2 and 3 before storage (hereinafter, referred to as Examples 2 and 3 before storage), boron was detected in the negative electrode generally in proportion to the content of Compound (II).

In Example 2 before storage, 50 μg/g of boron was detected in the positive electrode, and in Example 3 before storage, 50 μg/g of boron was detected in the positive electrode, suggesting that an inorganic component or the like migrated to the surface of the positive electrode even before storage.

In Example 2 after storage (hereinafter referred to as Example 2 after storage), about 3.1 times more boron was detected at the negative electrode than in Example 2 before storage, and in Example 3 after storage (hereinafter referred to as Example 3 after storage), about 2.4 times more boron was detected at the negative electrode than in Example 3 before storage.

This indicates that, in Examples 2 and 3, a negative electrode film containing an organic component and an inorganic component is formed on the surface of the negative electrode by electrochemical and chemical reactions during the storage period.

storage, an increase of about 5% in boron was observed compared to Example 3 before storage.

This indicates that, in Examples 2 and 3, an inorganic component migrated and adhered to the surface of the positive electrode due to electrochemical and chemical reactions during the storage period.

In particular, considering that organic components have a strong interaction with a separator and few of the organic components migrate to the positive electrode, the increase in boron before and after storage in Examples 2 and 3 is almost entirely inferred to be boron derived from the inorganic components.

The boron in Example 2 after storage increased by about 36% or more compared to Example 2 before storage, whereas the boron in Example 3 after storage only increased by about 5% compared to Example 3 before storage.

In other words, the increase rate of boron at the positive electrode during storage is considered to have a tendency to saturate in response to the increase in the content of Compound (II) in the non-aqueous electrolyte solution.

This indicates that once inorganic components adhere to the surface of the crystalline positive electrode structure to a certain extent, the inorganic components do not adhere further to the surface of the positive electrode, thereby suppressing excessive film formation on the surface of the positive electrode.

The disclosures of Japanese Patent Applications No. 2018-140561 filed on Jul. 26, 2018, Japanese Patent Application No. 2019-030029 filed on Feb. 22, 2019, Japanese Patent Application No. 2019-030031 filed on Feb. 22, 2019, and Japanese Patent Application No. 2018-030033 filed on Feb. 22, 2019, are incorporated herein by reference in their entirety.

All publications, patent applications, and technical standards mentioned in the present specification are incorporated herein by reference to the same extent as if each individual publication, patent application, or technical standard was specifically and individually indicated to be incorporated by reference.

The invention claimed is:

1. A lithium borate compound represented by the following Formula (I):

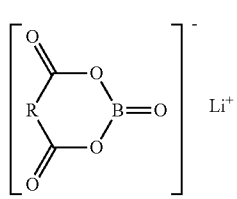

(I)

wherein, in Formula (I), R represents a single bond or an alkylene group having from 1 to 4 carbon atoms.

2. The lithium borate compound according to claim 1, wherein R is a single bond, a methylene group, or an ethylene group.

3. The lithium borate compound according to claim 1, which is a compound represented by the following Formula (II):

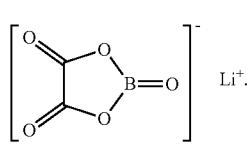

(II)

4. An additive for a lithium secondary battery, the additive comprising the lithium borate compound according to claim 1.

5. A non-aqueous electrolyte solution for a lithium secondary battery, the non-aqueous electrolyte solution comprising:
   an electrolyte that is a lithium salt containing fluorine;
   a non-aqueous solvent; and
   the lithium borate compound according to claim 1.

6. The non-aqueous electrolyte solution for a lithium secondary battery according to claim 5, wherein a content of the lithium borate compound is from 0.10% by mass to 5.0% by mass with respect to a total amount of the non-aqueous electrolyte solution for a lithium secondary battery.

7. The non-aqueous electrolyte solution for a lithium secondary battery according to claim 5, further comprising vinylene carbonate.

8. The non-aqueous electrolyte solution for a lithium secondary battery according to claim 7, wherein a value obtained by dividing a content mass of the lithium borate compound by a content mass of the vinylene carbonate is 0.125 or more.

9. The non-aqueous electrolyte solution for a lithium secondary battery according to claim 7, wherein a value obtained by dividing a content mass of the lithium borate compound by a content mass of the vinylene carbonate is 0.500 or less.

10. A lithium secondary battery precursor comprising:
    a casing; and
    a positive electrode, a negative electrode, a separator, and an electrolyte solution housed in the casing, wherein:
    the positive electrode is a positive electrode capable of storing and releasing lithium ions,
    the negative electrode is a negative electrode capable of storing and releasing lithium ions, and
    the electrolyte solution is the non-aqueous electrolyte solution for a lithium secondary battery according to claim 5.

11. The lithium secondary battery precursor according to claim 10, wherein the positive electrode comprises a lithium-containing composite oxide represented by the following Formula (C1) as a positive electrode active material:

$$\text{LiNi}_a\text{Co}_b\text{Mn}_c\text{O}_2 \qquad \text{Formula (C1)}$$

wherein, in Formula (C1), each of a, b, and c is independently from more than 0 to less than 1, and a sum of a, b, and c is from 0.99 to 1.00.

12. A method of producing a lithium secondary battery, the method comprising:
    preparing the lithium secondary battery precursor according to claim 10; and
    obtaining a lithium secondary battery by subjecting the lithium secondary battery precursor to an aging treatment,
    wherein the aging treatment includes subjecting the lithium secondary battery precursor to charging and discharging in an environment of from 30° C. to 50° C.

13. A lithium secondary battery, comprising:
    a casing, and
    a positive electrode, a negative electrode, a separator, and an electrolyte solution housed in the casing, wherein:
    the positive electrode is a positive electrode capable of absorbing and releasing lithium ions,
    the negative electrode is a negative electrode capable of absorbing and releasing lithium ions,
    the electrolyte solution is a non-aqueous electrolyte solution containing an electrolyte that is a lithium salt containing fluorine and a non-aqueous solvent,
    a negative electrode film containing an organic component and an inorganic component, derived from a lithium borate compound represented by the following Formula (I) and the electrolyte, is formed on at least a portion of a surface of the negative electrode, and
    a positive electrode film containing an inorganic component, derived from a lithium borate compound represented by the following Formula (I) and the electrolyte, is formed on at least a portion of a surface of the positive electrode:

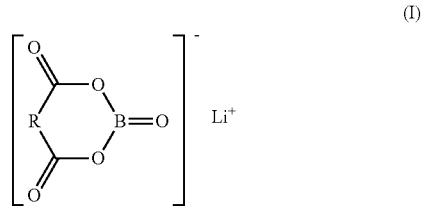

(I)

wherein, in Formula (I), R represents a single bond or an alkylene group having from 1 to 4 carbon atoms.

14. The lithium secondary battery according to claim 13, wherein:

the organic component in the negative electrode film contains a compound represented by the following Formula (III), and each of the inorganic component in the negative electrode film and the inorganic component in the positive electrode film contains a compound represented by the following Formula (IV):

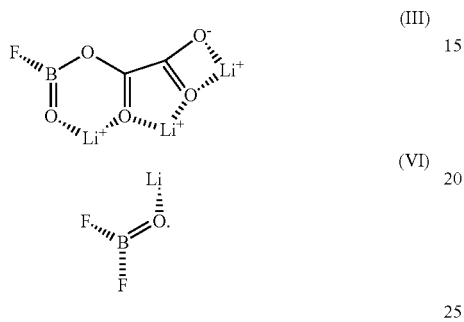

(III)

(VI)

* * * * *